US012744991B2

(12) United States Patent
Guo et al.

(10) Patent No.: US 12,744,991 B2
(45) Date of Patent: Sep. 22, 2026

(54) DISPLAY METHOD AND ELECTRONIC DEVICE

(71) Applicant: Huawei Technologies Co., Ltd., Shenzhen (CN)

(72) Inventors: Yangyang Guo, Shenzhen (CN); Tao Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 18/624,574

(22) Filed: Apr. 2, 2024

(65) Prior Publication Data

US 2024/0249484 A1 Jul. 25, 2024

Related U.S. Application Data

(63) Continuation of application No. PCT/CN2022/127535, filed on Oct. 26, 2022.

(30) Foreign Application Priority Data

Nov. 1, 2021 (CN) ......................... 202111283430.5
Mar. 7, 2022 (CN) ......................... 202210222388.4

(51) Int. Cl.

*G06T 19/00* (2011.01)
*G06F 3/04845* (2022.01)
*G06T 7/70* (2017.01)
*G06T 11/60* (2026.01)

(52) U.S. Cl.

CPC ........ *G06T 19/006* (2013.01); *G06F 3/04845* (2013.01); *G06T 7/70* (2017.01); *G06T 11/60* (2013.01)

(58) Field of Classification Search

CPC ......... G06T 19/006; G06T 7/70; G06T 11/60; G06F 3/04845; G06F 3/0485; G06F 3/04883; G06F 2203/04806; G06F 2203/04808; H04N 23/63

See application file for complete search history.

(56) References Cited

U.S. PATENT DOCUMENTS 6,973,220 B2 * 12/2005 Sakurai ..................... G06T 5/20 348/207.99
8,472,667 B2 * 6/2013 Suzuki ................... H04N 7/188 348/169
9,165,405 B2 * 10/2015 Meier ..................... G06T 15/20
(Continued)

FOREIGN PATENT DOCUMENTS

CN 107369204 A 11/2017
CN 112614234 A 4/2021
(Continued)

*Primary Examiner* — Motilewa Good-Johnson
(74) *Attorney, Agent, or Firm* — Conley Rose, P.C.

(57) ABSTRACT

An electronic device may display, by using a viewfinder picture in an augmented reality (AR) application interface, an object that is in the real world in which a user is located and that is collected by a camera. The user may enable, by performing an operation, the AR application to generate a mask in an area in which a first object is located in the viewfinder picture to block the first object. Then, a three-dimensional representation of a second object is projected onto the mask, where the second object is in a field of view range of the area in which the first object is located.

20 Claims, 11 Drawing Sheets

(56) References Cited

U.S. PATENT DOCUMENTS

| | | | | |
|---|---|---|---|---|
| 11,836,218 | B2* | 12/2023 | Thrimawithana | G06T 7/11 |
| 2013/0093788 | A1* | 4/2013 | Liu | G01C 21/365<br>345/633 |
| 2017/0221272 | A1* | 8/2017 | Li | G06T 19/006 |
| 2018/0350099 | A1* | 12/2018 | Yerkes | G06T 19/006 |
| 2020/0302681 | A1* | 9/2020 | Totty | G06T 7/74 |
| 2021/0142497 | A1 | 5/2021 | Pugh et al. | |
| 2021/0304754 | A1* | 9/2021 | Fortier | G06T 19/006 |
| 2023/0056676 | A1* | 2/2023 | Thrimawithana | G06T 7/194 |
| 2024/0378832 | A1* | 11/2024 | Joachim | G06T 5/50 |
| 2025/0086812 | A1* | 3/2025 | Engin | G06T 7/33 |

FOREIGN PATENT DOCUMENTS

| | | | |
|---|---|---|---|
| CN | 112669465 | A | 4/2021 |
| WO | 2018222248 | A1 | 12/2018 |

* cited by examiner

DISPLAY METHOD AND ELECTRONIC DEVICE

CROSS-REFERENCE TO RELATED APPLICATIONS

This is a continuation of International Patent Application No. PCT/CN2022/127535 filed on Oct. 26, 2022, which claims priority to Chinese Patent Application No. 202111283430.5 filed on Nov. 1, 2021 and Chinese patent application Ser. No. 202210222388.4 filed on Mar. 7, 2022. All of the aforementioned patent applications are hereby incorporated by reference in their entireties.

TECHNICAL FIELD

This disclosure relates to the field of media technologies, and in particular, to a display method and an electronic device.

BACKGROUND

An augmented reality (AR) technology is a technology that cleverly integrates virtual information with the real world. A plurality of technical means such as multimedia, three-dimensional modeling, real-time tracking and registration, intelligent interaction, and sensing are widely used to simulate virtual information such as a text, an image, a three-dimensional model, music, and a video that are generated by a computer. Then, simulated information is applied to the real world, and the two types of information complement each other, to implement "augmentation" of the real world.

However, an existing AR application has a simple function, lacks interaction and immersion, and has poor user experience.

SUMMARY

This disclosure provides a display method and an electronic device, to improve interaction and immersion of an AR application, so as to improve user experience when a user uses the AR application. To achieve the foregoing objective, the following technical solutions are used in this disclosure.

According to a first aspect, this disclosure provides a display method, applied to an electronic device including a camera. The method includes the electronic device starts, in response to a first operation, the camera and displays an application interface. Then, the electronic device performs, in response to a second operation, a third operation. The application interface includes a viewfinder frame, and a viewfinder picture of the viewfinder frame includes a target object. The third operation includes generating a first mask in a first area and projecting a first three-dimensional representation within a first field of view to the first mask. The first area is an area in which the target object in the viewfinder picture is located. The first field of view is a field of view corresponding to the first area on a three-dimensional map. The first field of view includes the first three-dimensional representation and a second three-dimensional representation. The second three-dimensional representation is a three-dimensional representation of the target object. The first three-dimensional representation is another three-dimensional representation other than the second three-dimensional representation in three-dimensional representations within the first field of view. The three-dimensional representation includes at least one of a point cloud, a mesh, or semantics.

In the display method provided in embodiments of this disclosure, the electronic device may display, by using the viewfinder picture in the AR application interface, an object that is in the real world in which a user is located and that is collected by the camera. The user may perform the operation to enable an AR application to first generate a mask in an area that is in the viewfinder picture and in which an object is located, to block the object. Then, another three-dimensional representation (namely, the first three-dimensional representation) other than a virtual three-dimensional object (namely, the second three-dimensional representation) corresponding to the object within a field of view (namely, the first field of view) corresponding to the area in which the object is located on the three-dimensional map is projected to the mask. In this way, the object that is in the real world in which the user is located in the AR application disappears invisibly with the operation of the user, and the AR application displays "the real world after the object disappears invisibly", to increase interaction between the AR application and the real world, and improve user immersion of the AR application.

For example, there is a cabinet in a room in which the user is located, and the user wants to see a background wall behind the cabinet but does not want to move the cabinet. In this case, the user may perform the operation to make the cabinet invisible and disappeared in the AR application, to view the background wall behind the cabinet by using the AR application, so as to increase the interaction between the AR application and the real world, and improve the user immersion of the AR application.

Optionally, the viewfinder picture of the viewfinder frame may include a plurality of objects, and the target object is any one of the plurality of objects.

In the display method provided in embodiments of this disclosure, the electronic device may display, by using the viewfinder picture in the AR application interface, the plurality of objects that are in the real world in which the user is located and that are collected by the camera. The user may first select one object from the plurality of objects as the target object, and then perform the operation to enable the AR application to first generate the mask in an area that is in the viewfinder picture and in which the target object is located, to block the object. Then, another three-dimensional representation (namely, the first three-dimensional representation) other than a virtual three-dimensional object (namely, the second three-dimensional representation) corresponding to the object within a field of view (namely, the first field of view) corresponding to the area in which the object is located on the three-dimensional map is projected to the mask. In this way, the object that is in the real world in which the user is located in the AR application disappears invisibly with the operation of the user, and the AR application displays "the real world after the object disappears invisibly", to increase the interaction between the AR application and the real world, and improve the user immersion of the AR application.

Optionally, the viewfinder picture of the viewfinder frame may include an editable object and a non-editable object, and the target object is any editable object.

In the display method provided in embodiments of this disclosure, the electronic device may display, by using the viewfinder picture in the AR application interface, the plurality of objects that are in the real world in which the user is located and that are collected by the camera. The user may first select one editable object from the plurality of objects as the target object, and then perform the operation to enable the AR application to first generate the mask in an area that is in the viewfinder picture and in which the target object is located, to block the object. Then, another three-dimensional representation (namely, the first three-dimensional representation) other than a virtual three-dimensional object (namely, the second three-dimensional representation) corresponding to the object within a field of view (namely, the first field of view) corresponding to the area in which the object is located on the three-dimensional map is projected to the mask. In this way, the object that is in the real world in which the user is located in the AR application disappears invisibly with the operation of the user, and the AR application displays “the real world after the object disappears invisibly”, to increase the interaction between the AR application and the real world, and improve the user immersion of the AR application.

In a possible implementation, the method may further include labeling three-dimensional representations on the three-dimensional map as the editable three-dimensional representation and the non-editable three-dimensional representation.

In the display method provided in embodiments of this disclosure, the three-dimensional representations on the three-dimensional map may be labeled as the editable three-dimensional representation and the non-editable three-dimensional representation. The electronic device may display, by using the viewfinder picture in the AR application interface, the plurality of objects that are in the real world in which the user is located and that are collected by the camera. The electronic device may determine, by using a three-dimensional label corresponding to the object, whether the object is the editable object. When the object selected by the user is the editable object, the object is used as the target object, and then the operation is performed to enable the AR application to first generate the mask in an area that is in the viewfinder picture and in which the target object is located, to block the object. Then, another three-dimensional representation (namely, the first three-dimensional representation) other than a virtual three-dimensional object (namely, the second three-dimensional representation) corresponding to the object within a field of view (namely, the first field of view) corresponding to the area in which the object is located on the three-dimensional map is projected to the mask. In this way, the object that is in the real world in which the user is located in the AR application disappears invisibly with the operation of the user, and the AR application displays “the real world after the object disappears invisibly”, to increase the interaction between the AR application and the real world, and improve the user immersion of the AR application.

In a possible implementation, the third operation may further include filling, based on the third three-dimensional representation, an area that is of the first mask and to which a three-dimensional representation is not projected. The third three-dimensional representation is a three-dimensional representation within a second field of view. The second field of view is a field of view adjacent to the first field of view.

It may be understood that, due to a shielding relationship between objects, a three-dimensional representation of a background part behind the object on the three-dimensional map may be incomplete. After the electronic device performs the third operation, a background behind an invisible object in the viewfinder picture may be incomplete, and the viewfinder picture is discontinuous. For the foregoing case, the area that is of the first mask and to which a three-dimensional representation is not projected may be filled based on the third three-dimensional representation, to supplement a missing background in the viewfinder picture, so that the viewfinder picture is continuous. This improves user experience of the AR application.

In a possible implementation, the method may further include that the electronic device performs, in response to a fourth operation, the third operation, to generate a second mask in a second area and project the second three-dimensional representation to the second mask.

In response to the operation of the user, the electronic device may alternatively first make invisible the object in the real world in which the user is located in the viewfinder picture in the AR application, and then generate a mask in an area (namely, the second area) specified by the user, and project a three-dimensional representation corresponding to the object to the mask. In this way, the object that is in the real world in which the user is located in the AR application moves with the operation of the user, and the AR application displays “the real world after the object moves”, to increase the interaction between the AR application and the real world, and improve the user immersion of the AR application.

In a possible implementation, the method may further include that the electronic device performs, in response to a fifth operation, the third operation, to generate a third mask in a third area and project a fourth three-dimensional representation to the third mask. The fourth three-dimensional representation is a deformed second three-dimensional representation.

In response to the operation of the user, the electronic device may also first make invisible the object in the real world in which the user is located in the viewfinder picture in the AR application, and then generate a mask in the viewfinder picture and project the deformed second three-dimensional representation to the mask. In this way, the object that is in the real world in which the user is located in the AR application deforms with the operation of the user, and the AR application displays “the real world after the object deforms”, to increase the interaction between the AR application and the real world, and improve the user immersion of the AR application.

In a possible implementation, the method may further include generating the fourth three-dimensional representation based on deformation information and three-dimensional coordinates of the second three-dimensional representation. The deformation information indicates a deformation type and a deformation ratio.

In response to the operation of the user, the electronic device may alternatively first make invisible the object in the real world in which the user is located in the viewfinder picture in the AR application, generate the fourth three-dimensional representation (namely, the deformed second three-dimensional representation) based on the deformation information and the three-dimensional coordinates of the second three-dimensional representation, and then generate the mask in the viewfinder picture and project the deformed second three-dimensional representation to the mask. In this way, the object that is in the real world in which the user is located in the AR application deforms with the operation of the user, and the AR application displays “the real world after the object deforms”, to increase the interaction between the AR application and the real world, and improve the user immersion of the AR application.

Optionally, the fourth three-dimensional representation may be a second three-dimensional representation after being zoomed in, zoomed out, or stretched. For example, the fourth three-dimensional representation may be a second three-dimensional representation that is zoomed in by 5 times.

In response to the operation of the user, the electronic device may also first make invisible the object in the real world in which the user is located in the viewfinder picture in the AR application, and then generate a mask in the viewfinder picture and project, to the mask, a second three-dimensional representation after being zoomed in, zoomed out, or stretched. In this way, the object that is in the real world in which the user is located in the AR application is zoomed in, zoomed out, or stretched with the operation of the user, and the AR application displays "the real world after the object is zoomed in, zoomed out, or stretched", to increase the interaction between the AR application and the real world, and improve the user immersion of the AR application.

Optionally, an anchor point of the second three-dimensional representation and an anchor point of the fourth three-dimensional representation may be the same. The anchor point is a point that is located in a direction of a perpendicular line of a center of gravity of a three-dimensional representation and that has a smallest Z-axis coordinate.

In a possible implementation, the method may further include determining a third field of view based on pose information of the viewfinder picture, and determining a field of view of an area within the third field of view based on a location of the area (for example, the first area, the second area, or the third area) in the viewfinder picture. The third field of view is a field of view corresponding to the viewfinder picture on the three-dimensional map.

In the display method provided in embodiments of this disclosure, the electronic device may display, by using the viewfinder picture in the AR application interface, the object that is in the real world in which the user is located and that is collected by the camera. The user may perform the operation to enable the AR application to first generate a mask in an area that is in the viewfinder picture and in which an object is located, to block the object, determine, based on the pose information of the viewfinder picture, the field of view (namely, the first field of view) corresponding to the area in which the object is located on the three-dimensional map, and then another three-dimensional representation (namely, the first three-dimensional representation) other than a virtual three-dimensional object (namely, the second three-dimensional representation) corresponding to the object within the field of view corresponding to the area in which the object is located on the three-dimensional map is projected to the mask. In this way, the object that is in the real world in which the user is located in the AR application disappears invisibly with the operation of the user, and the AR application displays "the real world after the object disappears invisibly", to increase the interaction between the AR application and the real world, and improve the user immersion of the AR application.

In a possible implementation, the method may further include determining the second three-dimensional representation from three-dimensional representations within the first field of view based on a first image block. The first image block is an image block that is in the viewfinder picture and that includes the target object.

In the display method provided in an embodiment of this disclosure, the electronic device may display, by using the viewfinder picture in the AR application interface, the object that is in the real world in which the user is located and that is collected by the camera. The user may perform the operation to enable the AR application to first generate the mask in the area that is in the viewfinder picture and in which the object is located, to block the object, determine, based on image block including the object, the three-dimensional representation corresponding to the object from the field of view (namely, the first field of view) corresponding to the area in which the object is located on the three-dimensional map, and then another three-dimensional representation (namely, the first three-dimensional representation) other than the virtual three-dimensional object corresponding to the object within the field of view corresponding to the area in which the object is located on the three-dimensional map is projected to the mask. In this way, the object that is in the real world in which the user is located in the AR application disappears invisibly with the operation of the user, and the AR application displays "the real world after the object disappears invisibly", to increase the interaction between the AR application and the real world, and improve the user immersion of the AR application.

According to a second aspect, this disclosure further provides another display method, applied to an electronic device including a camera, where the method includes the electronic device starts, in response to a first operation, the camera and displays an application interface. Then, the electronic device performs, in response to a second operation, a third operation. The application interface includes a viewfinder frame, and a viewfinder picture of the viewfinder frame includes a target object. The third operation includes generating a mask in a first area and projecting a three-dimensional representation within a first field of view to the first mask. The first area is an area in which the target object in the viewfinder picture is located. The first field of view is a field of view corresponding to the first area on a three-dimensional map. The three-dimensional representation includes at least one of a point cloud, a mesh, or semantics.

In the display method provided in embodiments of this disclosure, the electronic device may display, by using the viewfinder picture in the AR application interface, an object that is in the real world in which a user is located and that is collected by the camera. The user may perform the operation to enable an AR application to first generate a mask in an area that is in the viewfinder picture and in which an object is located, to block the object. Then, a virtual three-dimensional object (namely, the three-dimensional representation) within a field of view (namely, the first field of view) corresponding to the area in which the object is located on the three-dimensional map is projected to the mask. In this way, the object that is in the real world in which the user is located in the AR application disappears invisibly with the operation of the user, and the AR application displays "the real world after the object disappears invisibly", to increase interaction between the R application and the real world, and improve user immersion of the AR application.

For example, when the user shoots an object by using the AR application, a pedestrian appears in the viewfinder picture. The user may perform the foregoing display method by operating the electronic device, so that the pedestrian disappears in the viewfinder picture, and the viewfinder picture displays "the real world after the pedestrian disappears invisibly".

In a possible implementation, the electronic device may perform the third operation when there is no first three-dimensional representation within the first field of view. The first three-dimensional representation is the three-dimensional representation of the target object.

It may be understood that, there is no first three-dimensional representation within the first field of view. This indicates that the three-dimensional representation of the target object is not stored on the three-dimensional map, that is, a scene stored on the three-dimensional map is a scene in which the target object does not exist. Therefore, the three-dimensional representation of the area in which the target object is located on the three-dimensional map may be directly projected to the viewfinder picture, so that the target object disappears invisibly in the viewfinder picture.

In a possible implementation, the method further includes determining, based on a first image block, whether there is the first three-dimensional representation in the three-dimensional representation within the first field of view. The first image block is an image block that is in the viewfinder picture and that includes the target object. The first three-dimensional representation is the three-dimensional representation of the target object.

It may be understood that, when the first image block matches a corresponding three-dimensional representation within the first field of view, it indicates that there is the three-dimensional representation of the target object within the first field of view, and when the first image block does not match a corresponding three-dimensional representation within the first field of view, it indicates that there is no three-dimensional representation of the target object within the first field of view.

According to a third aspect, this disclosure further provides an electronic device, including at least one processor, a memory, and at least one camera. The memory and the camera are coupled to the processor. The memory is configured to store computer program code. The computer program code includes computer instructions. When the processor reads the computer instructions from the memory, the electronic device is enabled to perform the following operations: starting, in response to a first operation, the camera and displaying an application interface, where the application interface includes a viewfinder frame, and a viewfinder picture of the viewfinder frame includes a target object, and performing, in response to a second operation, a third operation, where the third operation includes generating a first mask in a first area and projecting a first three-dimensional representation within a first field of view to the first mask. The first area is an area in which the target object in the viewfinder picture is located. The first field of view is a field of view corresponding to the first area on a three-dimensional map. The first field of view includes the first three-dimensional representation and a second three-dimensional representation. The second three-dimensional representation is a three-dimensional representation of the target object. The first three-dimensional representation is another three-dimensional representation other than the second three-dimensional representation in three-dimensional representations within the first field of view. The three-dimensional representation includes at least one of a point cloud, a mesh, or semantics.

Optionally, the viewfinder picture of the viewfinder frame may include a plurality of objects, and the target object is any one of the plurality of objects.

Optionally, the viewfinder picture of the viewfinder frame may include an editable object and a non-editable object, and the target object is any editable object.

In a possible implementation, the processor is further configured to label three-dimensional representations on the three-dimensional map as an editable three-dimensional representation and a non-editable three-dimensional representation.

In a possible implementation, the third operation may further include filling, based on a third three-dimensional representation, an area that is of the first mask and to which a three-dimensional representation is not projected. The third three-dimensional representation is a three-dimensional representation within a second field of view. The second field of view is a field of view adjacent to the first field of view.

In a possible implementation, the processor is further configured to enable the electronic device to perform the following operation: performing, in response to a fourth operation, the third operation, to generate a second mask in a second area and project the second three-dimensional representation to the second mask.

In a possible implementation, the processor is further configured to enable the electronic device to perform the following operation: performing, in response to a fifth operation, the third operation, to generate a third mask in a third area and project a fourth three-dimensional representation to the third mask, where the fourth three-dimensional representation is a deformed second three-dimensional representation.

In a possible implementation, the processor is further configured to enable the electronic device to perform the following operation: generating the fourth three-dimensional representation based on deformation information and three-dimensional coordinates of the second three-dimensional representation, where the deformation information indicates a deformation type and a deformation ratio.

Optionally, the fourth three-dimensional representation may be a second three-dimensional representation after being zoomed in, zoomed out, or stretched. For example, the fourth three-dimensional representation may be a second three-dimensional representation that is zoomed in by 5 times.

Optionally, an anchor point of the second three-dimensional representation and an anchor point of the fourth three-dimensional representation may be the same. The anchor point is a point that is located in a direction of a perpendicular line of a center of gravity of a three-dimensional representation and that has a smallest Z-axis coordinate.

In a possible implementation, the processor is further configured to enable the electronic device to perform the following operations: determining a third field of view based on pose information of the viewfinder picture, and determining a field of view of an area within the third field of view based on a location of the area (for example, the first area, the second area, or the third area) in the viewfinder picture. The third field of view is a field of view corresponding to the viewfinder picture on the three-dimensional map.

In a possible implementation, the processor is further configured to enable the electronic device to perform the following operation: determining the second three-dimensional representation from the three-dimensional representations within the first field of view based on a first image block. The first image block is an image block that is in the viewfinder picture and that includes the target object.

According to a fourth aspect, this disclosure further provides a chip, including an input interface, an output interface, and at least one processor. Optionally, the chip further includes a memory. The at least one processor is configured to execute code in the memory. When the at least one processor executes the code, the chip implements the method in the first aspect or any possible implementation of the first aspect.

Optionally, the chip may be an integrated circuit.

According to a fifth aspect, this disclosure further provides a terminal. The terminal includes the foregoing electronic device or the foregoing chip.

According to a sixth aspect, this disclosure further provides a computer-readable storage medium configured to store a computer program. The computer program is configured to implement the method in the first aspect or any possible implementation of the first aspect.

According to a seventh aspect, this disclosure further provides a computer program product that includes instructions. When the computer program product runs on a computer, the computer is enabled to implement the method in the first aspect or any possible implementation of the first aspect.

The electronic device, the computer storage medium, the computer program product, or the chip provided in embodiments is configured to perform the display method provided above. Therefore, for beneficial effect that can be achieved by the electronic device, the computer storage medium, the computer program product, or the chip, refer to beneficial effect of the display method provided above. Details are not described herein again.

BRIEF DESCRIPTION OF DRAWINGS

To describe technical solutions in embodiments of this disclosure more clearly, the following briefly describes the accompanying drawings. It is clear that the accompanying drawings in the following description show merely some embodiments of this disclosure, and persons of ordinary skill in the art may derive other drawings from these accompanying drawings without creative efforts.

DESCRIPTION OF EMBODIMENTS

The following clearly and completely describes technical solutions in embodiments of this disclosure with reference to the accompanying drawings in embodiments of this disclosure. It is clear that the described embodiments are merely some but not all of embodiments of this disclosure. All other embodiments obtained by persons of ordinary skill in the art based on embodiments of this disclosure without creative efforts shall fall within the protection scope of this disclosure.

The term "and/or" in this specification describes only an association relationship for describing associated objects and represents that three relationships may exist. For example, A and/or B may represent the following three cases: only A exists, both A and B exist, and only B exists.

In the specification and accompanying drawings of this disclosure, the terms "first", "second", and the like are intended to distinguish between different objects or distinguish between different processing of a same object, but do not indicate a particular order of the objects.

In addition, the terms "including", "having", or any other variant thereof mentioned in descriptions of this disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that, in the descriptions of embodiments of this disclosure, the word "example" or "for example" is used to represent giving an example, an illustration, or a description. Any embodiment or design scheme described as "example" or "for example" in embodiments of this disclosure should not be construed as being preferred or having more advantages than another embodiment or design scheme. To be specific, use of the word "example" or "for example" or the like is intended to present a related concept in a specific manner.

In the descriptions of this disclosure, unless otherwise stated, "a plurality of" means two or more than two.

A display method in embodiments of this disclosure may be applied to an electronic device, such as a mobile phone, a tablet computer, a wearable device, a vehicle-mounted device, an AR device, a notebook computer, an ultra-mobile personal computer (UMPC), a netbook, or a personal digital assistant (PDA), for implementing an AR function. A specific type of the electronic device is not limited in embodiments of this disclosure.

Figure 1:
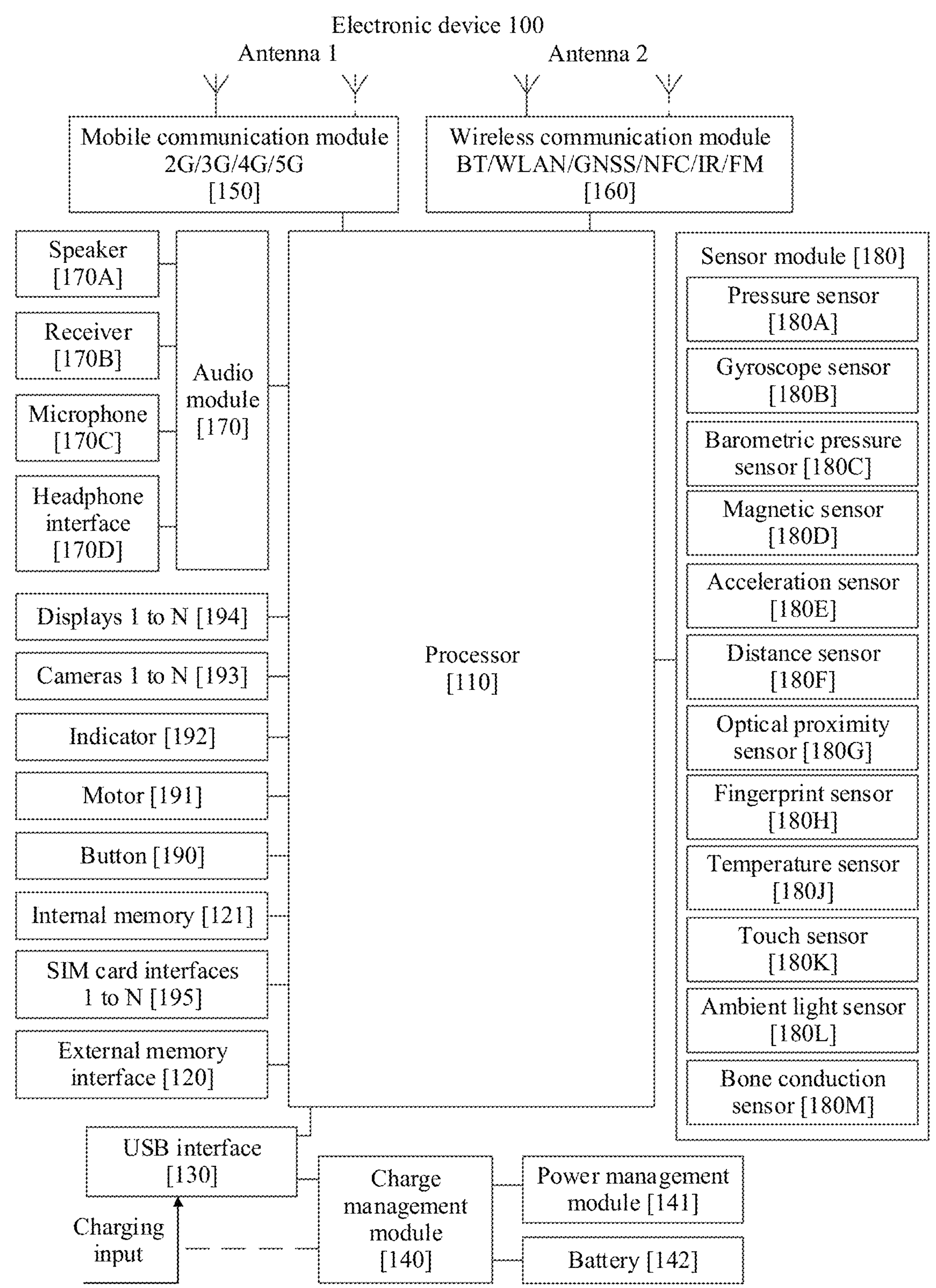
FIG. 1 is a schematic diagram of a structure of an electronic device according to an embodiment of this disclosure.

For example, FIG. 1 is a schematic diagram of a structure of an electronic device 100 according to an embodiment of this disclosure. The electronic device 100 may include a processor 110, an external memory interface 120, an internal memory 121, a Universal Serial Bus (USB) interface 130, a charge management module 140, a power management module 141, a battery 142, an antenna 1, an antenna 2, a mobile communication module 150, a wireless communication module 160, an audio module 170, a speaker 170A, a receiver 170B, a microphone 170C, a headphone interface 170D, a sensor module 180, a button 190, a motor 191, an indicator 192, a camera 193, a display 194, and a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and an ambient light sensor 180L, a bone conduction sensor 180M, and the like.

It may be understood that a structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware. For example, in a possible implementation, the electronic device 100 may further include components such as a vision sensor, an inertial measurement unit (IMU), a laser radar, and a magnetometer.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate devices, or may be integrated in one or more processors.

The controller may be a nerve center and a command center of the electronic device 100. The controller may generate an operation control signal based on an instruction operation code and a timing signal, to complete control on instruction fetching and instruction execution.

A memory may be further disposed in the processor 110, and is configured to store instructions and data. In some embodiments, the processor 110 may include one or more interfaces. The interface may include an inter-integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB interface, and/or the like.

For example, the I2C interface is a bidirectional synchronous serial bus. The processor 110 may be coupled to the touch sensor 180K through the I2C interface, so that the processor 110 and the touch sensor 180K communicate with each other through the I2C bus interface, to implement a touch function of the electronic device 100. The MIPI interface may be configured to connect to the processor 110 and a peripheral device such as the display 194 and the camera 193. The MIPI interface includes a camera serial interface (CSI), a display serial interface (DSI), and the like. In some embodiments, the processor 110 communicates with the camera 193 through the CSI interface to implement a photographing function of the electronic device 100. The processor 110 communicates with the display 194 through the DSI interface to implement a display function of the electronic device 100.

It can be understood that an interface connection relationship between modules illustrated in this embodiment of this disclosure is merely an illustrative description, and does not constitute a limitation on a structure of the electronic device 100. In some other embodiments of this disclosure, the electronic device 100 may alternatively use an interface connection manner different from that in the foregoing embodiment, or use a combination of a plurality of interface connection manners.

The charge management module 140 is configured to receive a charging input from the charger. The charger may be a wireless charger or a wired charger. The power management module 141 is configured to connect to the battery 142, the charge management module 140, and the processor 110. The power management module 141 receives an input of the battery 142 and/or the charge management module 140, and supplies power to the processor 110, the internal memory 121, an external memory, the display 194, the camera 193, the wireless communication module 160, and the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a shooting function through the ISP, the camera 193, a touch sensor, the video codec, the GPU, the display 194, the application processor, and the like.

The ISP is configured to process data fed back by the camera 193. For example, during photographing, a shutter is opened, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on image noise, brightness, and a skin tone. The ISP may further optimize parameters such as exposure and a color temperature of a shot scenario. In some embodiments, the ISP may be disposed in the camera 193.

The camera 193 is configured to capture a still image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert it into a digital image signal. The ISP outputs the digital image signal to the DSP for processing. The DSP converts the digital image signal into an image signal in a format such as standard red, green, and blue (RGB) or luma, red projection, and blue projection (YUV). It should be understood that in a description of this embodiment of this disclosure, an image in an RGB format is used as an example for description. An image format is not limited in this embodiment of this disclosure. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 can play or record videos in a plurality of encoding formats, for example, Moving Picture Experts Group (MPEG)-1, MPEG-2, MPEG-3, and MPEG-4.

The external memory interface 120 may be configured to connect to an external memory card, for example, a micro SD card, to extend a storage capability of the electronic device 100. The internal memory 121 may be configured to store computer executable program code, where the executable program code includes instructions. The processor 110 performs various function applications and data processing of the electronic device 100 by running the instructions stored in the internal memory 121. The internal memory 121 may include a program storage area and a data storage area.

The electronic device 100 may implement an audio function through the audio module 170, the speaker 170A, the receiver 170B, the microphone 170C, the headset jack 170D, the application processor, and the like. For example, music playback, recording, and the like.

The pressure sensor 180A is configured to sense a pressure signal, and can convert the pressure signal into an electrical signal. The gyro sensor 180B may be configured to determine a motion posture of the electronic device 100. The barometric pressure sensor 180C is configured to measure barometric pressure. The magnetic sensor 180D includes a Hall sensor. The electronic device 100 may detect opening and closing of a flip holster by using the magnetic sensor 180D. The acceleration sensor 180E may detect magnitude of accelerations in various directions (usually on three axes) of the electronic device 100. The distance sensor 180F is configured to measure a distance. The electronic device 100 may measure a distance through infrared or laser. In some embodiments, in a shooting scenario, the electronic device 100 may use the distance sensor 180F to measure a distance to achieve fast focusing. The optical proximity sensor 180G may include, for example, a light-emitting diode (LED), and an optical detector, for example, a photodiode. The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The bone conduction sensor 180M may obtain a vibration signal. The audio module 170 may parse out a voice signal based on the vibration signal of the sound vibration bone obtained by the bone conduction sensor 180M, to implement a voice function.

The button 190 includes a power button, a volume button, and the like. The button 190 may be a mechanical button, or may be a touch button. The electronic device 100 may receive a button input, and generate a button signal input related to user setting and function control of the electronic device 100. The motor 191 may generate a vibration alert. The motor 191 may be used for vibration alerts for incoming calls, and may also be used for touch vibration feedback. For example, touch operations performed on different applications (for example, photographing and audio playing) may correspond to different vibration feedback effect. For touch operations on different regions of the display 194, the motor 191 may also correspondingly generate different vibration feedback effect. The indicator 192 may be an indicator, and may be configured to indicate a charging status and a power change, or may be configured to indicate a message, a missed call, a notification, and the like. The SIM card interface 195 is configured to connect to a SIM card.

A software system of the electronic device 100 may use a layered architecture, an event-driven architecture, a microkernel architecture, a micro service architecture, or a cloud architecture. In embodiments of this disclosure, an operating system of a layered architecture is used as an example to describe a software structure of the electronic device 100.

Figure 2:
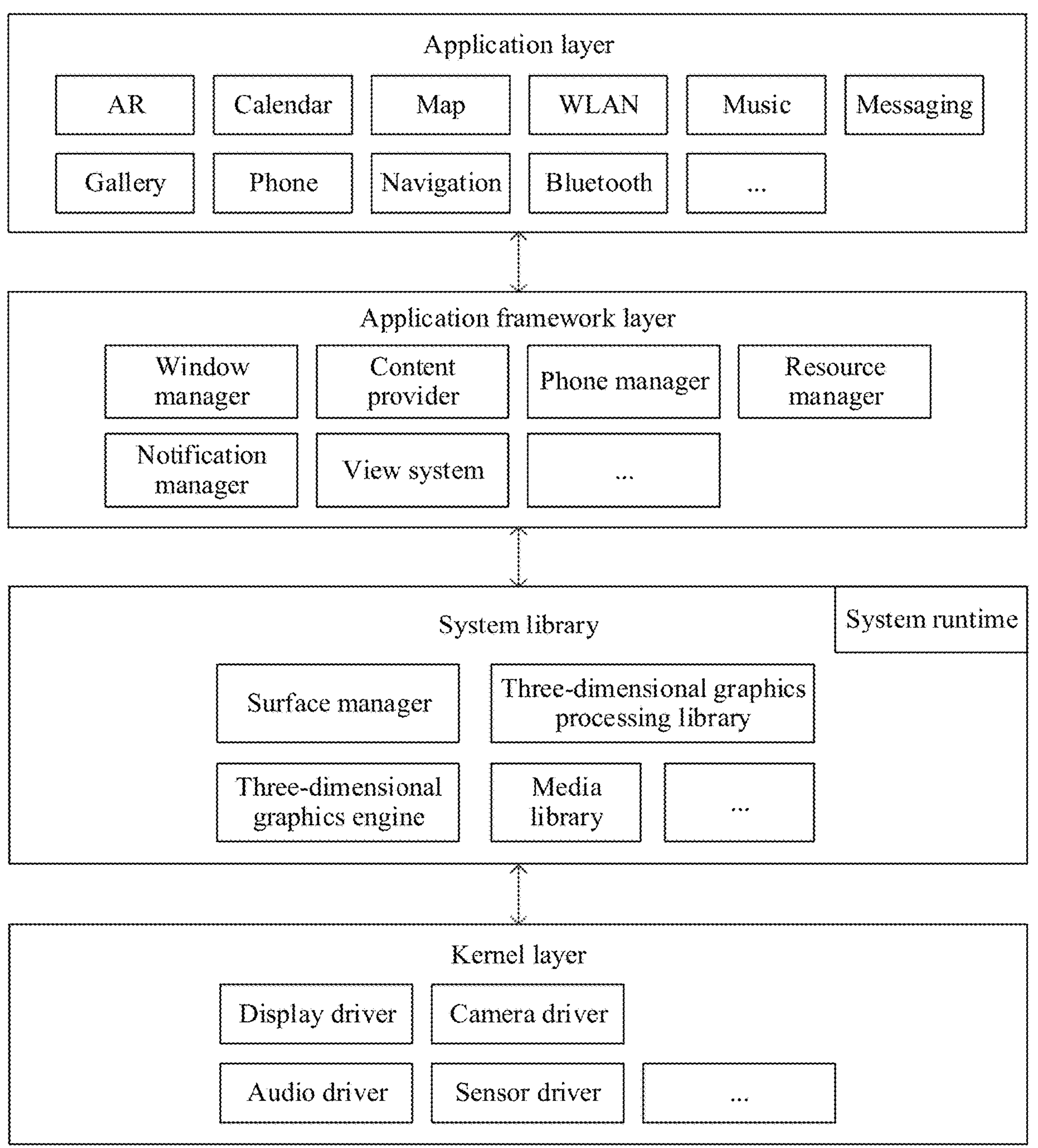
FIG. 2 is a schematic diagram of a software structure of an electronic device according to an embodiment of this disclosure.

FIG. 2 is a block diagram of the software structure of the electronic device 100 in this embodiment of this disclosure. Software is divided into several layers by using the layered architecture, and each layer has a clear role and task. The layers communicate with each other by using a software interface. In some embodiments, the operating system is divided into four layers: an application layer, an application framework layer, an operating system runtime (runtime) and system library, and a kernel layer from top to bottom.

The application layer may include a series of application packages. As shown in FIG. 2, the application package may include application programs such as Camera, Gallery, Music, and Settings.

The application framework layer provides an application programming interface (API) and a programming framework for an application at the application layer. The application framework layer includes some predefined functions. As shown in FIG. 2, the application program framework layer may include a window manager, a content provider, a view system, a resource manager, a notification manager, and the like.

The window manager is used to manage a window program. The window manager may obtain a display size, determine whether there is a status bar, lock a screen, take a screenshot, and the like.

The content provider is used to store and obtain data, and enables these data to be accessible to an application. The data may include a video, an image, audio, calls that are made and received, browsing history and bookmarks, a phonebook, and the like.

The view system includes visual controls, such as a control for displaying text, a control for displaying pictures, and the like. The view system may be used to construct an application. A display interface may include one or more views. For example, a display interface including a message notification icon may include a view for displaying text and a view for displaying pictures.

The resource manager provides resources for applications, such as localized strings, icons, images, layout files, and video files.

The notification manager enables an application to display notification information in the status bar, which can be used to convey a notification-type message. The notification information displayed in the status bar may automatically disappear after a short pause, for example, a message reminder used to notify a user of download completion. The notification manager may alternatively be a notification that appears in the status bar at the top of the system in the form of a chart or scroll bar text, such as a notification for an application running in the background, or a notification that appear on the screen in the form of a dialog window. For example, text information is displayed in the status bar, or an announcement may be produced by the notification manager, for example, an electronic device vibrates, or the indicator blinks.

The runtime includes a kernel library and a virtual machine. The runtime is responsible for scheduling and management of the operating system. The kernel library includes two parts. One part is a function that is invoked by a Java language, and the other part is a kernel library of the operating system.

The application layer and the application framework layer run on a virtual machine. The virtual machine executes java files at the application layer and the application framework layer as binary files. The virtual machine is configured to implement functions such as object lifecycle management, stack management, thread management, security and exception management, and garbage collection.

A system library may include a plurality of functional modules, for example, a surface manager, a media library, a three-dimensional graphics processing library (for example, an open graphics library (OpenGL) for embedded systems (ES)), and a 2D graphics engine (for example, a scene graph library (SGL)).

The surface manager is configured to manage a display subsystem and provide fusion of two-dimensional (2D) and three-dimensional (3D) layers for a plurality of applications.

The media library supports playback and recording in a plurality of commonly used audio and video formats, and static image files. The media library may support a plurality of audio and video coding formats, for example, MPEG-4, H.264, MP3, advanced audio coding (AAC), adaptive multi rate (AMR), Joint Photographic Experts Group (JPEG), portable network graphics (PNG), and the like.

The three-dimensional graphics processing library is configured to implement three-dimensional graphics drawing, image rendering, composition, layer processing, and the like. The 2D graphics engine is a graphics engine for 2D graphics.

The kernel layer is a layer between hardware and software. The kernel layer may include a hardware driver module, for example, a display driver, a camera driver, or a sensor driver. The application framework layer may invoke the hardware driver module of the kernel layer.

For ease of understanding, in the following embodiments of this disclosure, the electronic device having the structure shown in FIG. 1 and FIG. 2 is used as an example, to describe a display method provided in embodiments of this disclosure.

All technical solutions in the following embodiments may be implemented in the electronic device 100 having the foregoing hardware architecture and software architecture.

The following describes in detail the technical solutions provided in embodiments of this disclosure with reference to the accompanying drawings.

Figure 3:
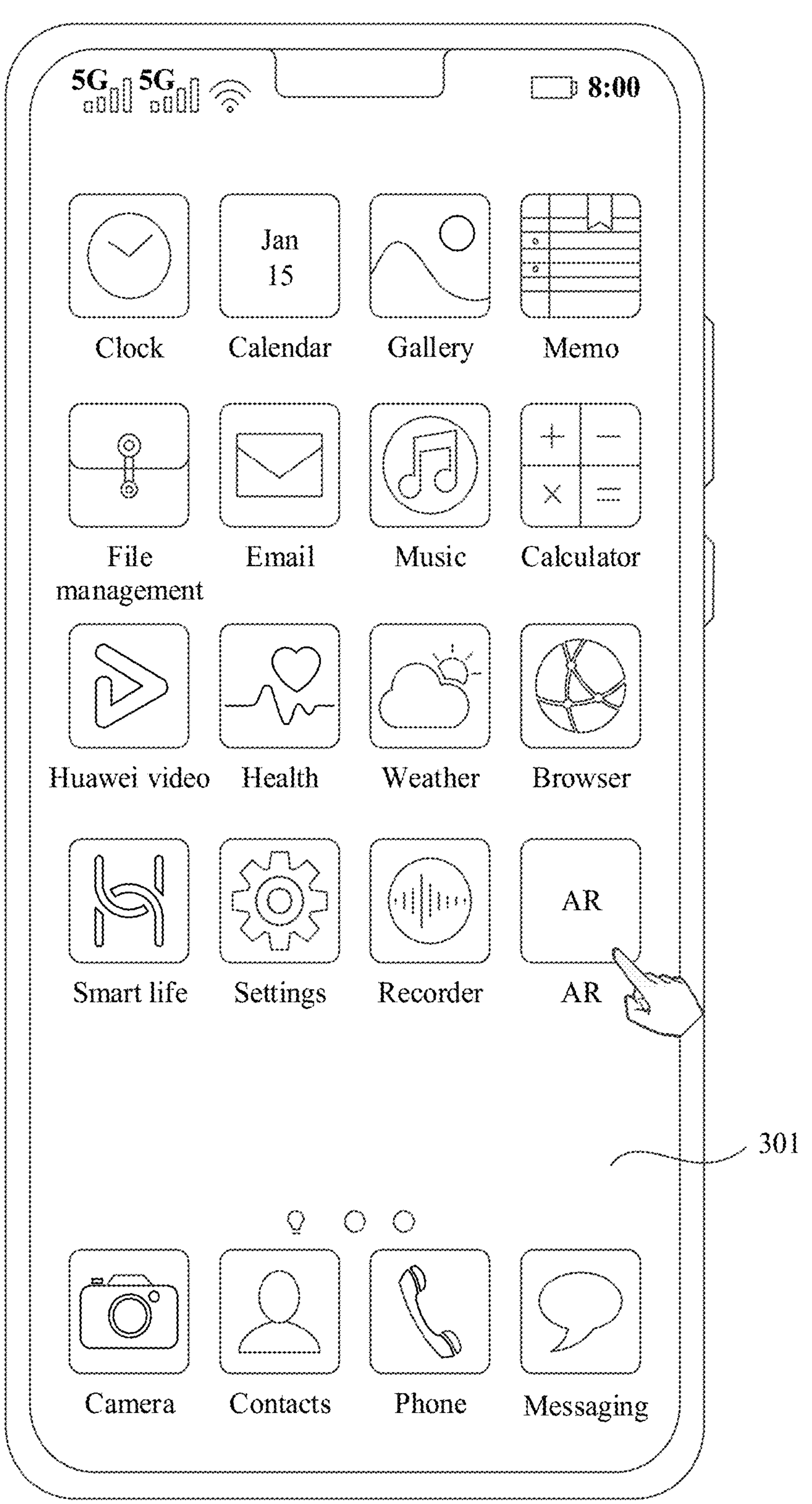
FIG. 3 is a schematic diagram of a user interface of an electronic device according to an embodiment of this disclosure.

FIG. 3 is a schematic diagram of a graphical user interface (GUI) according to an embodiment of this disclosure. FIG. 3 shows that in an unlock mode of an electronic device 100, a screen display system of the electronic device 100 displays currently output interface content 301. The interface content 301 is a main interface of the electronic device 100. The interface content 301 displays a plurality of applications, for example, AR, Camera, Contacts, Phone, Messaging, or Clock. It may be understood that the interface content 301 may further include more or fewer other applications. This is not limited in this embodiment of this disclosure.

A user may touch a specific control on a screen of the electronic device 100, press a specific physical button or a button combination, input a voice, or make an air gesture, to indicate the electronic device 100 to start the AR application. In response to receiving an indication of the user to start the AR application, the electronic device 100 starts the camera and the AR application, and displays an AR application interface. The indication of the user to indicate the electronic device 100 to start the AR application may be referred to as a first operation.

For example, as shown in FIG. 3, the user may tap an "AR" application icon on the main interface, to indicate the electronic device 100 to start the AR application. The electronic device 100 displays the application interface shown in FIG. 4A.

For another example, when the electronic device 100 is in a screen-locked state, the user may alternatively indicate, by using a gesture of sliding down on the screen of the electronic device 100, the electronic device 100 to start the AR application. The electronic device 100 displays the application interface shown in FIG. 4A. Alternatively, when the electronic device 100 is in a screen-locked state, the user may tap a shortcut icon of the "AR" application on a screen-locked interface, to indicate the electronic device 100 to start the AR application. The electronic device 100 displays the application interface shown in FIG. 4A.

For still another example, when the electronic device 100 runs another application, the user may alternatively tap a corresponding control to enable the electronic device 100 to start the AR application. For example, when the user is using an instant messaging application, the user may alternatively select an AR function control, to indicate the electronic device 100 to start the AR application. The electronic device 100 displays the application interface shown in FIG. 4A.

Figures 4A, 4B, 4C:
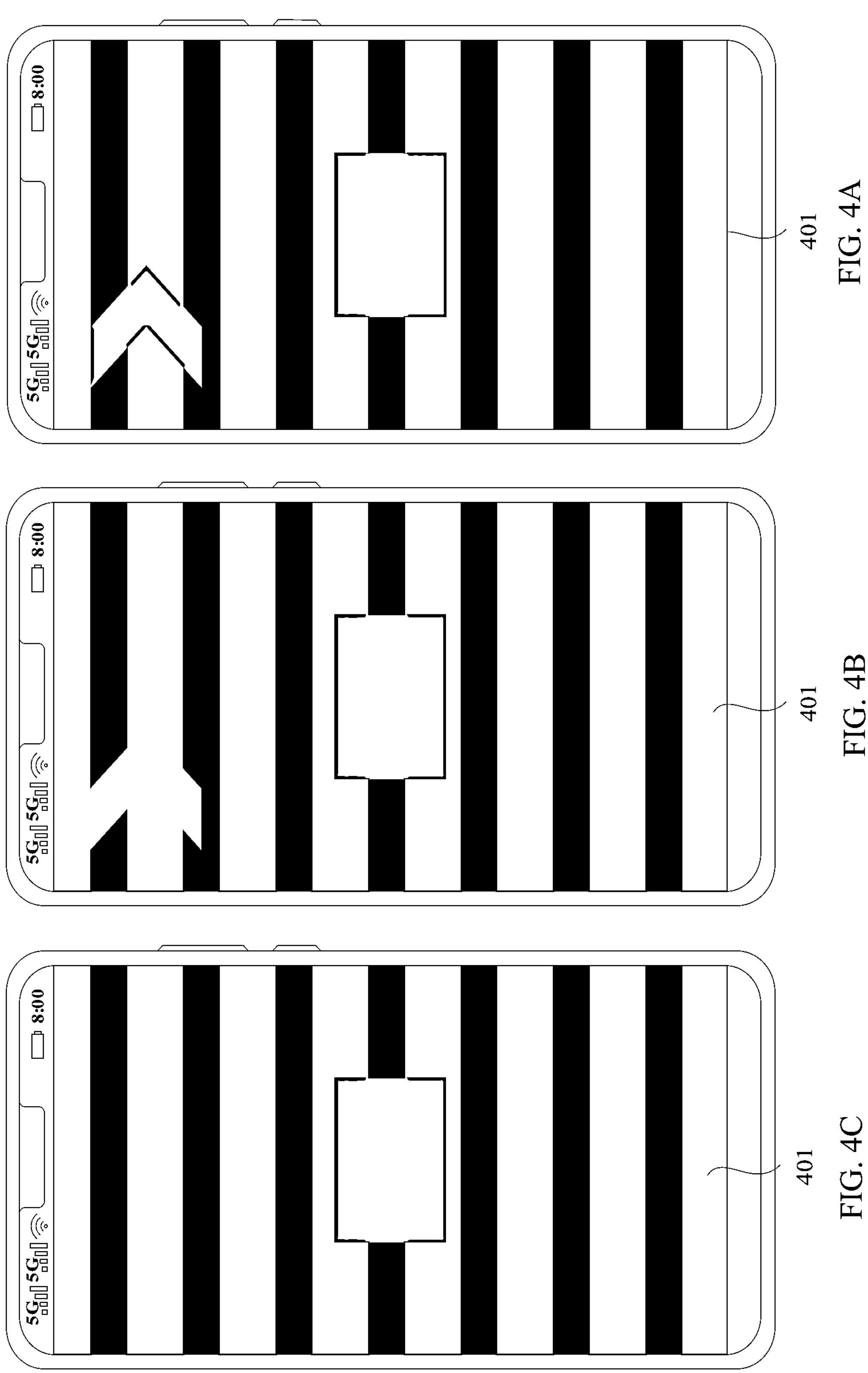
FIG. 4A, FIG. 4B, and FIG. 4C show a schematic diagram of a user interface of another electronic device according to an embodiment of this disclosure.

As shown in FIG. 4A, the interface of the AR application includes a viewfinder frame 401, and the viewfinder frame 401 may be used to preview an image (or a picture) captured by the camera. The viewfinder frame 401 shown in FIG. 4A may be used to preview a viewfinder picture, captured by the camera, that includes a V-shaped object, a rectangular object, a black stripe background, and a white stripe background. In this case, all objects in the viewfinder picture are objects in a real scene.

After the AR application is started, the electronic device 100 may read an established three-dimensional map (referred to as an offline three-dimensional map below), or the electronic device 100 may establish a three-dimensional map online (referred to as an online three-dimensional map). The three-dimensional map may include a three-dimensional representation (including information such as a point cloud, a mesh, semantics, and an image feature point).

The foregoing specific method for establishing the three-dimensional map may be processed by using any method that can be thought of by persons skilled in the art. This is not specifically limited in this embodiment of this disclosure. For example, data collected by a sensor such as a vision sensor, an inertial measurement unit (IMU), a light detection and ranging (LIDAR), a magnetometer, a Global Positioning System (GPS), and the like can be used to establish the three-dimensional map according to an algorithm such as simultaneous localization and mapping (SLAM) or structure from motion (SFM).

When generating the three-dimensional map, a device for generating the three-dimensional map or an electronic device may save the three-dimensional map as a file offline. Different saving modes may be used for three-dimensional maps of different types of scenarios. For example, for a family-level scenario (for example, a three-dimensional map of a room or a three-dimensional map of an entire house), a corresponding map may be saved as one file, and is directly read during use. For scenarios of a shopping mall and a scenic spot, because maps of these scenarios are large, corresponding maps each may be divided into small blocks and stored in blocks. When the corresponding map is used, the electronic device 100 may read or load, based on location information (for example, a GPS or a location-based service (LBS)) of the electronic device 100, the three-dimensional map in blocks.

A user may touch a specific control on a screen of the electronic device 100, press a specific physical button or a button combination, input a voice, or make an air gesture, to select a target object and indicate the electronic device 100 to edit (for example, to make invisible, to move, or to deform) the target object in the viewfinder picture. The viewfinder picture may include a plurality of objects, the plurality of objects may be collectively referred to as first objects, and the target object may be any one of the plurality of first objects. For example, the target object may be the V-shaped object or the rectangular object shown in FIG. 4A.

Optionally, the viewfinder picture may include an editable object and a non-editable object. The target object may be any editable object. A three-dimensional representation corresponding to the editable object on the three-dimensional map is an editable three-dimensional representation, and a three-dimensional representation corresponding to the non-editable object on the three-dimensional map is a non-editable three-dimensional representation, or there is no three-dimensional representation corresponding to the non-editable object on the three-dimensional map. The non-editable object may include the background in the viewfinder picture and an object that exists in the viewfinder picture but does not exist on the three-dimensional map (namely, an object, referred to as a second object below, that exists in the real scene but does not exist on the three-dimensional map). For example, the V-shaped object and the rectangular object in the viewfinder picture shown in FIG. 4A are editable objects of the first objects, and the black stripe background and the white stripe background are non-editable objects of the first objects.

It may be understood that when the three-dimensional map is an offline map, because establishment time of the offline map is earlier than generation time of the viewfinder picture, the object in the viewfinder picture may be inconsistent with an object on the three-dimensional map. For example, there is no object on a table in a room when a three-dimensional map of a room is established, but after the three-dimensional map is established, someone places a cup on the table. When the user uses the AR application in the room, it may be seen, by using the viewfinder picture, that there is the cup in the room, but there is no cup on the three-dimensional map. In this case, the cup is a non-editable object of the first objects in a scene.

After the user selects the target object, the electronic device 100 may determine, from the three-dimensional map, a three-dimensional representation corresponding to the object. For example, the user may touch and hold an object in the viewfinder picture to select the target object. After the user selects the object, the electronic device 100 may first select, in the viewfinder picture by using an image segmentation technology, an image block (referred to as a first image block below) that includes the target object, and then determine, based on the first image block, a three-dimensional representation corresponding to the target object from three-dimensional representations on the three-dimensional map.

It should be noted that a size of the three-dimensional representation corresponding to the target object may be larger than a size of a part that is of the target object and that is displayed in an image of the target object in the viewfinder picture. For example, there is only half a table in the viewfinder picture. After the user taps a three-dimensional representation matching the table on the three-dimensional map, a subsequent editing function may be an operation on the three-dimensional representation of the entire table.

In a possible implementation, the electronic device 100 may determine, based on pose information of the viewfinder picture, a field of view (referred to as a third field of view below) corresponding to the viewfinder picture on the three-dimensional map, and then determine, from three-dimensional representations in the third field of view, the three-dimensional representation corresponding to the target object.

For example, the electronic device 100 uses a relocation technology and a SLAM real-time tracking technology to determine the third field of view, and then determines, from the three-dimensional representations in the third field of view, the three-dimensional representation corresponding to the target object. For example, the SLAM is first used to establish a local coordinate system by using the viewfinder picture as an origin, and the relocation technology is used to calculate, based on sensor data collected by the electronic device 100, 6-degree-of-freedom (DoF) pose of the viewfinder picture of the electronic device 100 on the three-dimensional map and a delta pose of the local coordinate system of the viewfinder picture and a coordinate system of the three-dimensional map. Based on the delta pose, the local coordinate system is aligned with the coordinate system of the three-dimensional map, the third field of view is determined based on the 6-DoF pose of the viewfinder picture, and then 2D-3D matching is performed on the three-dimensional representations of the third field of view and the first image block. When matched three-dimensional representations of most feature points of the first image block belong to a same three-dimensional representation, it is determined that the three-dimensional representation is the three-dimensional representation corresponding to the target object.

In another possible implementation, the electronic device 100 may determine, based on the pose information of the viewfinder picture, the field of view (referred to as the third field of view below) corresponding to the viewfinder picture on the three-dimensional map, determine, based on a location of the first image block in the viewfinder picture, a field of view corresponding to the first image block on the three-dimensional map from the third field of view, and then determine, from three-dimensional representations in the field of view corresponding to the first image block, the three-dimensional representation corresponding to the target object.

The foregoing specific relocation method may be processed by using any method that can be thought of by persons skilled in the art. This is not specifically limited in this embodiment of this disclosure. For example, a matching scheme (for example, oriented fast and rotated brief SLAM (ORB-SLAM) and visual-inertial system (VINS)) based on a bag-of-words (BoW) model, a method (for example, parallel tracking and mapping (PTAM)) based on a machine learning matching patch, or a net vector of locally aggregated descriptors (NetVlad) method based on deep learning.

In a possible implementation, the electronic device 100 (or another device) may label three-dimensional representations on the three-dimensional map as the editable three-dimensional representation and the non-editable three-dimensional representation.

In a possible implementation, the electronic device 100 may determine whether an object selected by the user is the editable object. When the object selected by the user is the non-editable object, text information, image information, or sound information may be used to prompt the user that the object selected by the user is the non-editable object. For example, the electronic device 100 may determine, based on label information, whether the object selected by the user is a background, and determine whether there is a three-dimensional representation corresponding to the object selected by the user on the three-dimensional map, to determine whether the object selected by the user is the second object. If the object is neither the background nor the second object, the object is determined as the editable object, and if the object is the background or the second object, the object is determined as the non-editable object.

The label information is used to identify whether the object is the background. A three-dimensional semantic segmentation/detection technology may be used to label an object on the three-dimensional map. For example, the point cloud or the mesh of the object on the three-dimensional map (for example, a SLAM map) may be semantically segmented/detected, discretized, and numbered to label which object is the editable object (for example, a table, a stool, a cup, or a computer) on the three-dimensional map, and which object is the background (for example, ground or a wall), for subsequent editing and processing. Any three-dimensional semantic segmentation/detection technology may be used. This is not limited in this embodiment of this disclosure.

In another possible implementation, the electronic device 100 may label the target object in the viewfinder picture for the user to select the target object. For example, the electronic device 100 may highlight an editable first object in the viewfinder picture when the user does not select the target object, and stop highlighting after the user selects the target object. For example, before the user selects the target object, based on the 6-DoF pose of a current viewfinder picture, a three-dimensional representation within a field of view corresponding to the current viewfinder picture on the three-dimensional map is projected and matched on the current viewfinder picture, a correspondence between an image block in the viewfinder picture and the three-dimensional representation is established, and the image block is labeled for distinguishing and highlighted based on the correspondence between the image block and the three-dimensional representation, to prompt the user which image block is the editable object that can be selected. After the user taps the image block of the editable object, the image block of the editable object immediately matches the corresponding three-dimensional representation. After user selection, processing can be closed.

In a possible implementation, the user may touch the specific control on the screen of the electronic device 100, press the specific physical button or the button combination, enter the voice, or make the air gesture, to indicate to make the target object in the viewfinder picture invisible.

After the user performs an operation (referred to as a second operation below) of making the target object invisible on the electronic device 100, the electronic device 100 performs, in response to the second operation, a third operation. The third operation includes generating a first mask in a first area and projecting a first three-dimensional representation within a first field of view to the first mask. The first area is an area in which the target object in the viewfinder picture is located. The first field of view is a field of view corresponding to the first area on a three-dimensional map. The first field of view includes the first three-dimensional representation and a second three-dimensional representation. The second three-dimensional representation is a three-dimensional representation corresponding to the target object. The first three-dimensional representation is another three-dimensional representation other than the second three-dimensional representation in three-dimensional representations within the first field of view.

For example, if the user wants to make the V-shaped object (namely, the target object) invisible in the viewfinder picture shown in FIG. 4A, the user may touch and hold the V-shaped object to indicate the electronic device 100 to make the V-shaped object invisible. As shown in FIG. 4B, the electronic device 100 first generates, in response to an operation of the user, the first mask in an area in which the V-shaped object is located in the viewfinder picture, to block the V-shaped object. Then, as shown in FIG. 4C, the electronic device 100 projects, to the foregoing mask, another three-dimensional representation (namely, the first three-dimensional representation) other than a three-dimensional representation (namely, the second three-dimensional representation) corresponding to the V-shaped object within a field of view (namely, the first field of view) corresponding to the area in which the V-shaped object is located on the three-dimensional map. It can be seen from FIG. 4C that the V-shaped object is invisible (disappeared) in the viewfinder picture of the viewfinder frame 401. The user can view a background (namely, a black stripe and a white stripe) behind the V-shaped object in FIG. 4C.

In a possible implementation, the third operation may alternatively be projecting the second three-dimensional representation to the first mask, then deleting display content on the first mask, and then projecting the first three-dimensional representation to the first mask.

In a display method provided in an embodiment of this disclosure, the electronic device may display, by using the viewfinder picture in an AR application interface, an object that is in the real world in which the user is located and that is collected by the camera. The user may perform the operation to enable an AR application to first generate a mask in an area that is in the viewfinder picture and in which an object is located, to block the object. Then, another three-dimensional representation (namely, the first three-dimensional representation) other than a three-dimensional representation (namely, the second three-dimensional representation) corresponding to the object within a field of view (namely, the first field of view) corresponding to the area in which the object is located on the three-dimensional map is projected to the mask. In this way, the object that is in the real world in which the user is located in the AR application disappears invisibly with the operation of the user, and the AR application displays "the real world after the object disappears invisibly", to increase interaction between the AR application and the real world, and improve user immersion of the AR application.

For example, there is a cabinet in a room in which the user is located, and the user wants to see a background wall behind the cabinet but does not want to move the cabinet. In this case, the user may perform the operation to make the cabinet invisible and disappeared in the AR application, so as to view the background wall behind the cabinet by using the AR application, to increase the interaction between the AR application and the real world, and improve the user immersion of the AR application.

Optionally, the electronic device 100 may encapsulate the foregoing "third operation" as an "invisible operation" for another function or another operation to invoke.

In a possible implementation, the first mask may not completely overlap the target object in the viewfinder picture, that is, the first mask may not block the target object in the viewfinder picture. In this case, the electronic device 100 may use the image segmentation technology, to supplement and generate a supplementary mask attached to the target object. In addition, if there is the display content in the supplemented and generated supplementary mask, the electronic device 100 may further delete the display content in the supplementary mask.

The foregoing specific image segmentation method may be processed by using any method that can be thought of by persons skilled in the art. This is not specifically limited in this embodiment of this disclosure.

Figures 5A, 5B, 5C:
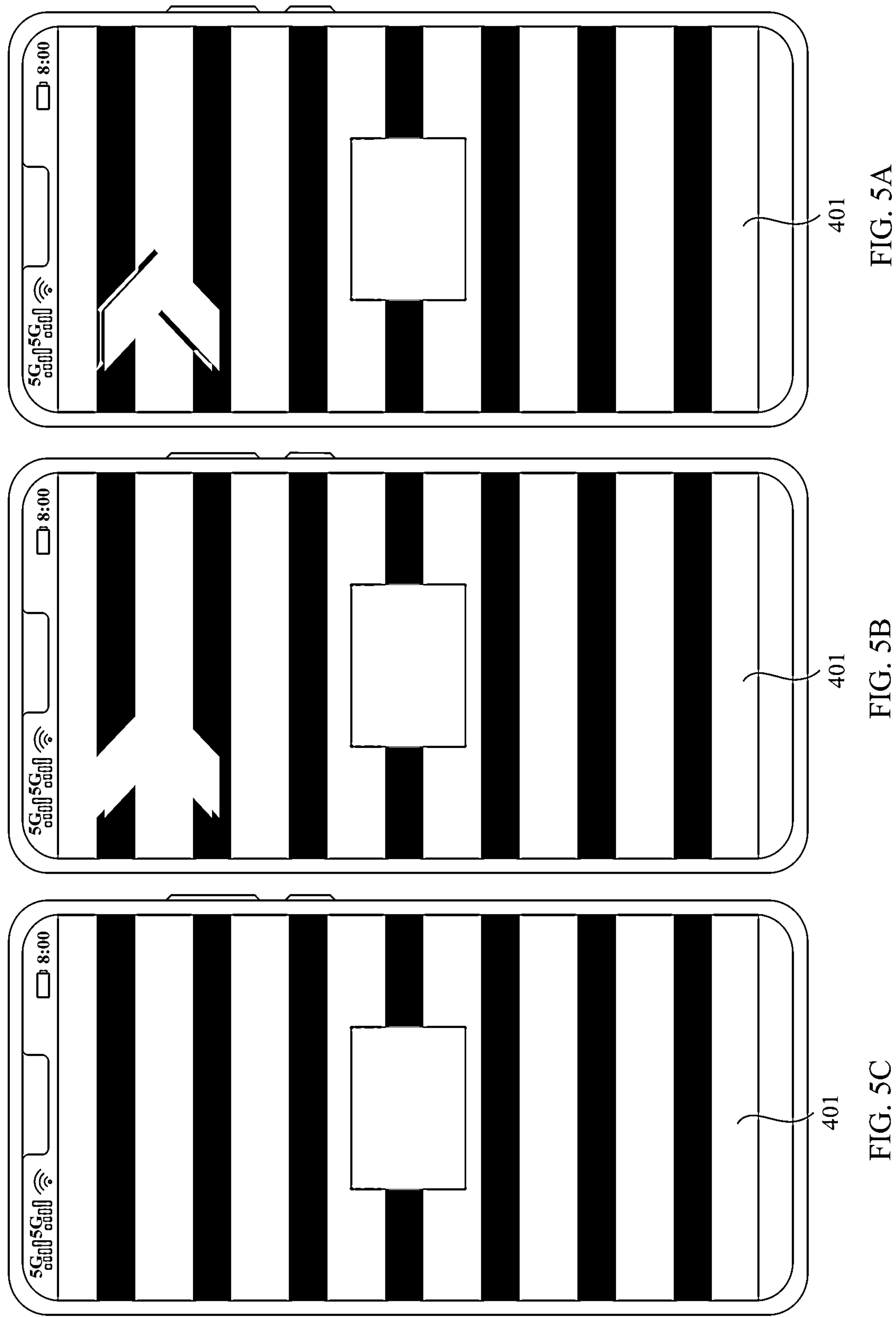
FIG. 5A, FIG. 5B, and FIG. 5C show a schematic diagram of a user interface of still another electronic device according to an embodiment of this disclosure.

For example, if the user wants to make the V-shaped object invisible in the viewfinder picture shown in FIG. 4A, the user may use a voice instruction to indicate the electronic device 100 to make the V-shaped object invisible. The electronic device 100 responds to the operation of the user. As shown in FIG. 5A, the electronic device 100 first generates a first mask in an area in which a V-shaped object is located in a viewfinder picture to block the V-shaped object. It can be learned from FIG. 5A that the first mask does not completely block the V-shaped object. As shown in FIG. 5B, the electronic device 100 supplements and generates a supplementary mask. It can be learned from FIG. 5B that the first mask and the supplementary mask have blocked the V-shaped object. Then, as shown in FIG. 5C, the electronic device 100 projects, another three-dimensional representation other than a three-dimensional representation corresponding to the V-shaped object within a field of view corresponding to the area in which the V-shaped object is located on a three-dimensional map, to the first mask and the supplementary mask. It can be learned from FIG. 5C that the V-shaped object has been invisible in the viewfinder picture of the viewfinder frame 401. A user can view a background behind the V-shaped object in FIG. 5C.

In a possible implementation, due to a shielding relationship between objects, a three-dimensional representation of a background part behind the object on the three-dimensional map may be incomplete. After the electronic device 100 performs the invisible operation, a background behind an invisible object in the viewfinder picture may be incomplete, and the viewfinder picture is discontinuous. In the foregoing case, the user may touch a specific control on a screen of the electronic device 100, press a specific physical button or a button combination, enter a voice, or make an air gesture, to indicate the electronic device 100 to perform a background supplement operation to supplement a missing background in the viewfinder picture, so that the viewfinder picture is continuous. Alternatively, the electronic device 100 may identify whether a background of the viewfinder picture in the viewfinder frame is complete, and when the background is incomplete, a background supplement operation is performed to supplement a missing background in the viewfinder picture, so that the viewfinder picture is continuous. Alternatively, a background supplement operation may be added to the third operation, and the electronic device 100 automatically performs the background supplement operation when performing the third operation.

The foregoing specific method for making the viewfinder picture continuous (the background supplement operation) by supplementing the missing background in the viewfinder picture may be processed by using any method that can be thought of by persons skilled in the art. This is not specifically limited in this embodiment of this disclosure. For example, an area that is of a mask and to which a three-dimensional representation is not projected may be filled based on a three-dimensional representation, to supplement the missing background in the viewfinder picture, so that the viewfinder picture is continuous. For another example, an artificial intelligence (AI) technology may be used to supplement the missing background in the viewfinder picture, so that the viewfinder picture is continuous.

Figures 6A, 6B:
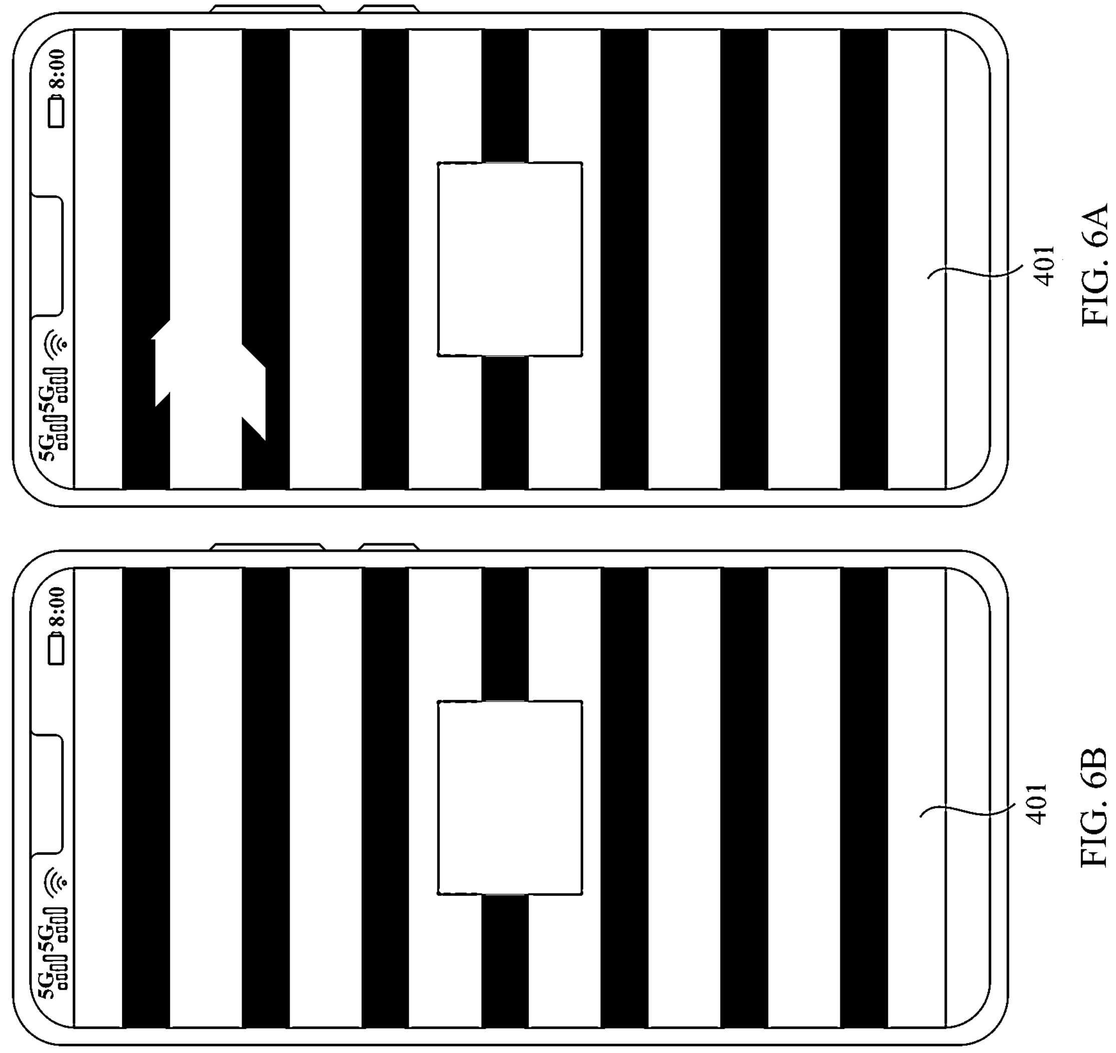
FIG. 6A and FIG. 6B show a schematic diagram of a user interface of still another electronic device according to an embodiment of this disclosure.

For example, if the user wants to make the V-shaped object invisible in the viewfinder picture shown in FIG. 4A, the user may use the voice instruction to indicate the electronic device 100 to make the V-shaped object invisible. The electronic device 100 responds to the operation of the user. As shown in FIG. 4B, the electronic device 100 first generates the first mask in the area in which the V-shaped object is located in the viewfinder picture to block the V-shaped object. As shown in FIG. 6A, the electronic device 100 projects a first three-dimensional representation to the mask. It can be learned from FIG. 6A that the V-shaped object has been invisible in a viewfinder picture of the viewfinder frame 401, but a background behind the V-shaped object is missing, and consequently, the viewfinder picture is discontinuous. In this case, the electronic device 100 may project a third three-dimensional representation to an area that is of the mask and to which a three-dimensional representation is not projected, to obtain a viewfinder picture shown in FIG. 6B. It can be learned from FIG. 6B that the viewfinder picture is continuous and the missing background in the viewfinder picture is completed. The third three-dimensional representation is a three-dimensional representation within a second field of view. The second field of view is a field of view adjacent to the first field of view.

A user may also touch a specific control on a screen of the electronic device 100, press a specific physical button or a button combination, enter a voice, or make an air gesture, to indicate the electronic device 100 to move an object in the viewfinder picture.

After the user performs an operation (referred to as a fourth operation below) on the electronic device 100 for moving a target object, the electronic device 100 first performs a third operation in response to the fourth operation to make the target object invisible in the viewfinder picture. Then, a second mask is generated in a second area, and a second three-dimensional representation (namely, the second three-dimensional representation corresponding to the target object) is projected to the second mask. The second area is an area of a target location in the viewfinder picture. For example, the user may perform a tap operation to select the target location. For another example, the user may perform a drag operation to move the object in the viewfinder picture, and the electronic device 100 may determine an end location of the drag operation of the user as the target location.

Figures 7A, 7B, 7C:
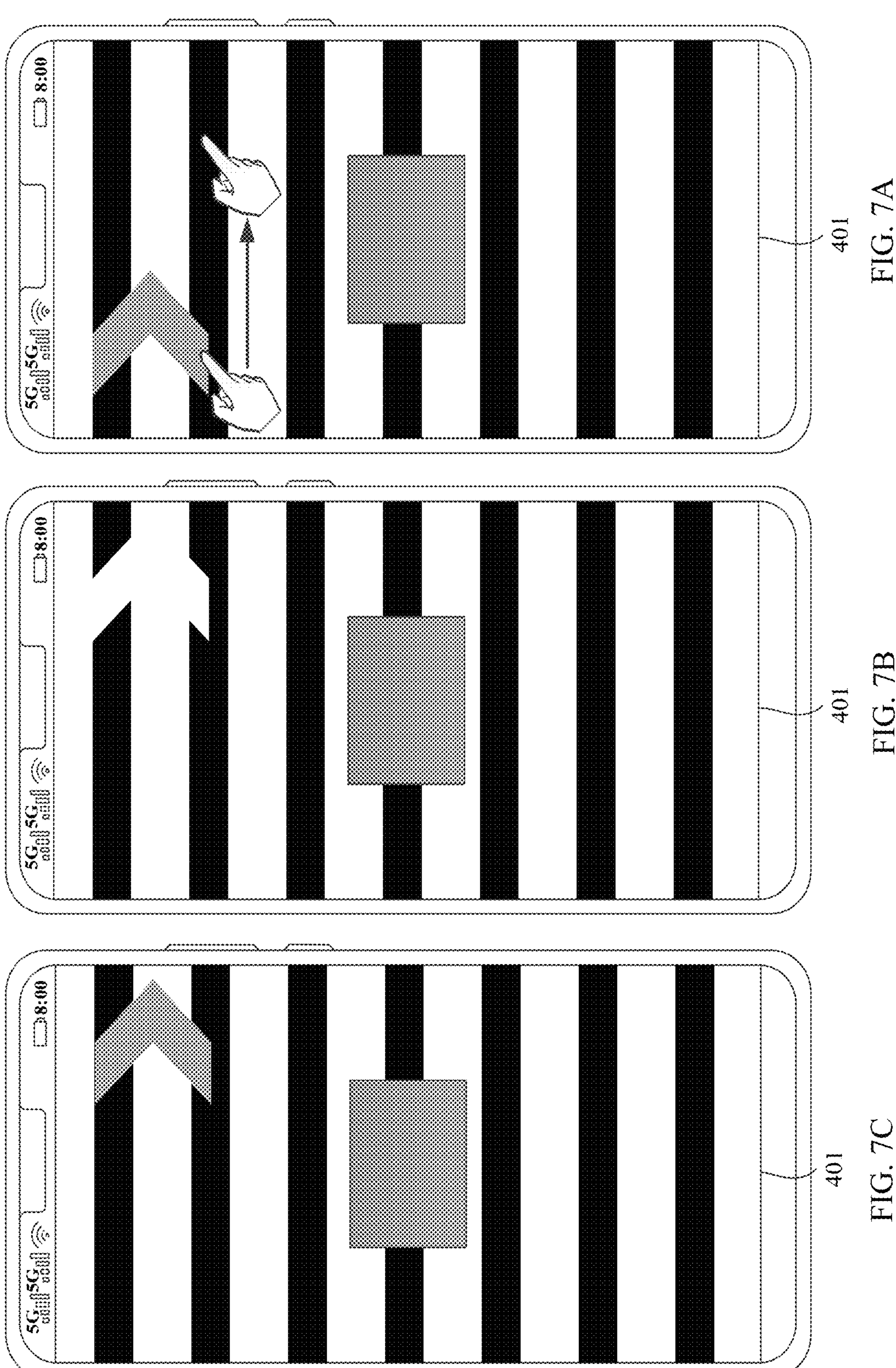
FIG. 7A, FIG. 7B, and FIG. 7C show a schematic diagram of a user interface of still another electronic device according to an embodiment of this disclosure.

For example, as shown in FIG. 7A, a user performs a drag operation to indicate the electronic device 100 to move a V-shaped object from a lower left corner of a viewfinder picture to an upper left corner of the viewfinder picture. The electronic device 100 responds to an operation of the user. As shown in FIG. 7B, the electronic device 100 first performs a third operation on the V-shaped object to make the V-shaped object invisible in the viewfinder picture of the viewfinder frame 401, and generates a second mask in the upper left corner of the viewfinder picture of the viewfinder frame 401. As shown in FIG. 7C, the electronic device 100 projects a three-dimensional representation corresponding to the V-shaped object to the second mask. It can be seen from FIG. 7C that the V-shaped object has moved from the lower left corner of the viewfinder picture of the viewfinder frame 401 to the upper left corner of the viewfinder picture of the viewfinder frame 401.

In response to the operation of the user, an electronic device may alternatively first make invisible an object in the real world in which the user is located in the viewfinder picture in an AR application, and then generate a mask in an area (namely, a second area) specified by the user, and project a three-dimensional representation corresponding to the object to the mask. In this way, the object that is in the real world in which the user is located in the AR application moves with the operation of the user, and the AR application displays "the real world after the object moves", to increase interaction between the AR application and the real world, and improve user immersion of the AR application.

In a possible implementation, before generating the second mask in the second area and projecting a second three-dimensional representation to the second mask, the electronic device 100 may further determine a second target location on a three-dimensional map based on a target location in the viewfinder picture, and then move the second three-dimensional representation to the second target location. For example, the electronic device 100 may first determine, on a plane of the three-dimensional map based on the target location in the viewfinder picture, coordinates of a three-dimensional representation corresponding to the target location, move an anchor point of the second three-dimensional representation to the coordinates, and then perform a same movement on a remaining three-dimensional representation of the second three-dimensional representation, to move the second three-dimensional representation to the second target location. The plane of the three-dimensional map is a plane including three-dimensional representations on the three-dimensional map.

Optionally, the anchor point is a point that is located in a direction of a perpendicular line of a center of gravity of the three-dimensional representation and that has a smallest Z-axis coordinate.

The user may also touch a specific control on a screen of the electronic device 100, press a specific physical button or a button combination, enter a voice, or make an air gesture, to indicate the electronic device 100 to deform (for example, to zoom in, to zoom out, or to stretch) the object in the viewfinder picture. For example, an AR interface may be provided with a configuration button such as zooming in (for example, zooming in by five times), zooming out (for example, zooming out by 10 times), horizontal stretch (for example, a width is increased by two times), and vertical stretch (for example, a length and a height are increased by three times). The user may touch the configuration button to indicate the electronic device 100 to deform the object in the viewfinder picture. For another example, the user may perform an operation such as finger opening/closing for zooming control to deform the object in the viewfinder picture.

After the user performs an operation (referred to as a fifth operation below) of deforming the target object on the electronic device 100, the electronic device 100 performs, in response to the fifth operation, the third operation, then generates a third mask in a third area, and projects a fourth three-dimensional representation to the third mask. The fourth three-dimensional representation is a deformed second three-dimensional representation.

Optionally, the fourth three-dimensional representation may be a second three-dimensional representation after being zoomed in, zoomed out, or stretched.

Figures 8A, 8B, 8C:
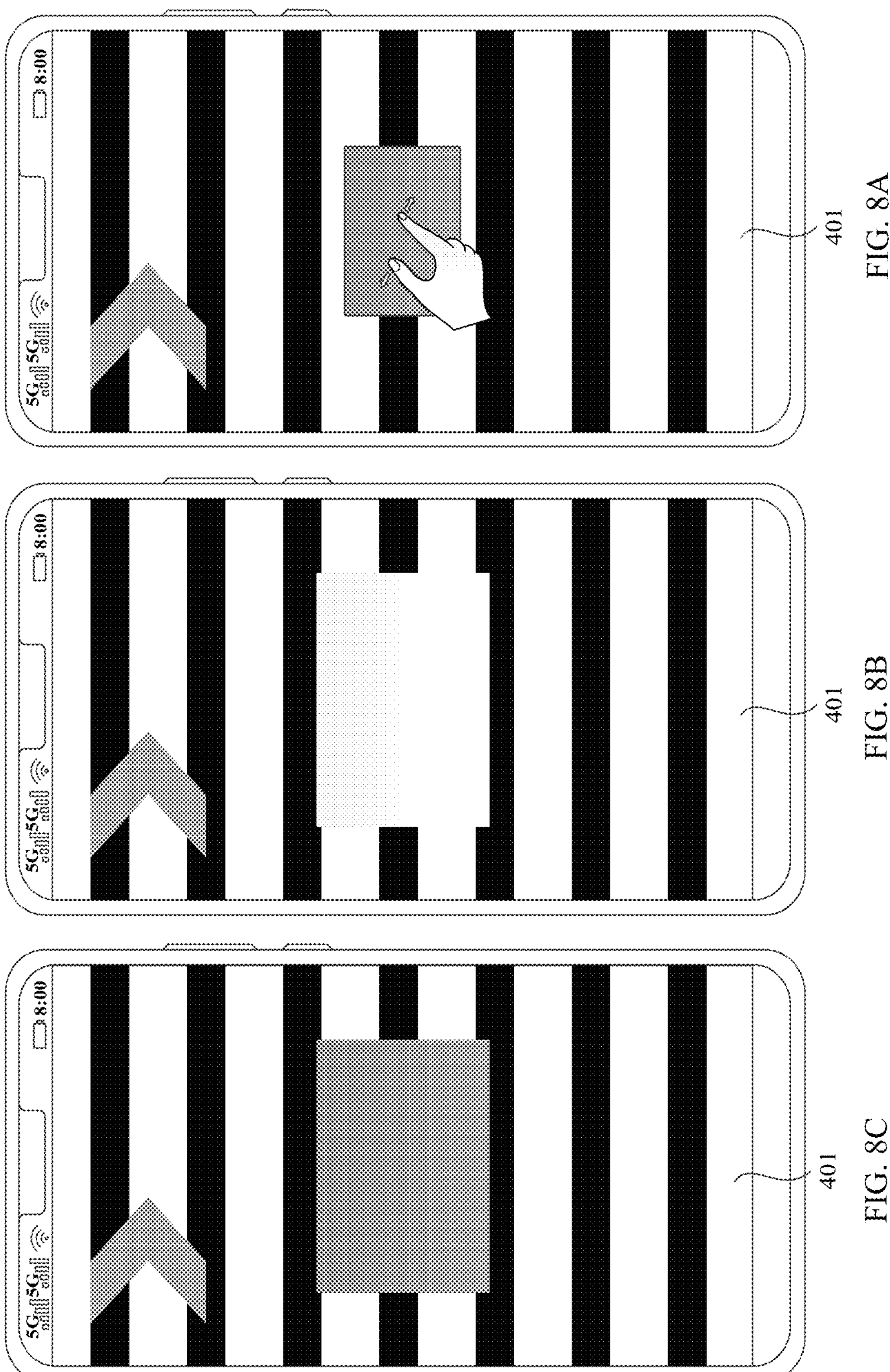
FIG. 8A, FIG. 8B, and FIG. 8C show a schematic diagram of a user interface of still another electronic device according to an embodiment of this disclosure.

For example, as shown in FIG. 8A, a user performs a two-finger opening operation to indicate the electronic device 100 to zoom in a rectangular object in a viewfinder picture of the viewfinder frame 401. As shown in FIG. 8B, the electronic device 100 first performs, in response to an operation of the user, a third operation on the rectangular object to make the rectangular object invisible in the viewfinder picture of the viewfinder frame 401, and generates a third mask in the viewfinder picture of the viewfinder frame 401. Then, the electronic device 100 generates a fourth three-dimensional representation based on a three-dimensional representation (namely, a second three-dimensional representation) corresponding to the rectangular object. Then, as shown in FIG. 8C, the electronic device 100 projects the fourth three-dimensional representation to the third mask. It can be seen from FIG. 8C that the rectangular object in the viewfinder picture of the preview frame 401 has been zoomed in.

In the display method provided in this embodiment of this disclosure, the user may alternatively perform the operation to deform an object in the real world in which the user is located in an AR application. In this way, the AR application displays "the real world after the object deforms", to increase interaction between the AR application and the real world, and improve user immersion of the AR application.

Optionally, an anchor point of the second three-dimensional representation and an anchor point of the fourth three-dimensional representation may be the same.

In a possible implementation, the electronic device 100 may generate the fourth three-dimensional representation based on deformation information and three-dimensional coordinates of the second three-dimensional representation. The deformation information indicates a deformation type and a deformation ratio.

For example, the user touches a corresponding configuration button to indicate the electronic device 100 to zoom in an object in the viewfinder picture by five times. The electronic device 100 responds to the operation of the user, determines, based on the operation of the user, that the deformation type is zooming in, and the deformation ratio is five times, uses the anchor point of the second three-dimensional representation as a zooming-in/out origin, to calculate coordinate differences between coordinates of other points (three-dimensional representations) in a three-dimensional coordinate system and the anchor point, multiplies a coordinate difference of each point by five, and then adds coordinates of the anchor point to a coordinate difference multiplied by five, to obtain a new three-dimensional representation (for example, the fourth three-dimensional representation) that is zoomed in by five times.

Figure 9:
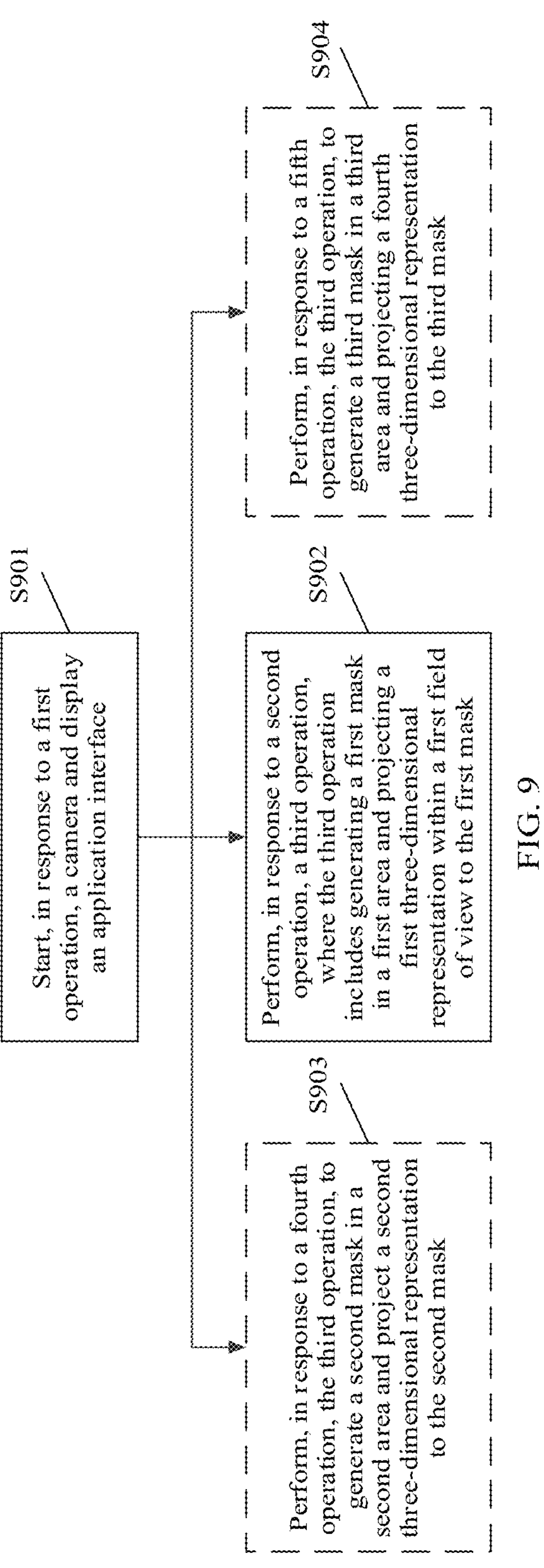
FIG. 9 is a schematic flowchart of a display method according to an embodiment of this disclosure.

The following describes a display method provided in embodiments of this disclosure with reference to FIG. 9. As shown in FIG. 9, the method includes the following steps.

S901: The electronic device 100 starts, in response to a first operation, a camera and displays an application interface.

The application interface includes a viewfinder frame, and a viewfinder picture of the viewfinder frame includes a target object.

It may be understood that the viewfinder picture of the viewfinder frame may include a plurality of objects, and the target object is any one of the plurality of objects.

Optionally, the viewfinder picture of the viewfinder frame may include an editable object and a non-editable object. A first object may be any one of editable objects. A three-dimensional representation corresponding to the editable object on a three-dimensional map is an editable three-dimensional representation, and a three-dimensional representation corresponding to the non-editable object on the three-dimensional map is a non-editable three-dimensional representation, or there is no three-dimensional representation corresponding to the non-editable object on the three-dimensional map.

In a possible implementation, the electronic device 100 may label three-dimensional representations on the three-dimensional map as the editable three-dimensional representation and the non-editable three-dimensional representation.

S902: The electronic device 100 performs, in response to a second operation, a third operation, where the third operation includes generating a first mask in a first area and projecting a first three-dimensional representation within a first field of view to the first mask.

The first area is an area in which the target object in the viewfinder picture is located. The first field of view is a field of view corresponding to the first area on the three-dimensional map. The first field of view includes the first three-dimensional representation and a second three-dimensional representation. The second three-dimensional representation is a three-dimensional representation corresponding to the target object. The first three-dimensional representation is another three-dimensional representation other than the second three-dimensional representation in three-dimensional representations within the first field of view.

In a possible implementation, the third operation further includes filling, based on a third three-dimensional representation, an area that is of the first mask and to which a three-dimensional representation is not projected. The third three-dimensional representation is a three-dimensional representation within a second field of view, and the second field of view is a field of view adjacent to the first field of view.

In a possible implementation, the electronic device 100 may further determine the second three-dimensional representation from the three-dimensional representations within the first field of view based on a first image block. The first image block is an image block that is in the viewfinder picture and that includes the target object.

As shown in FIG. 9, the method may include the following steps.

S903: The electronic device performs, in response to a fourth operation, the third operation, to generate a second mask in a second area, and project the second three-dimensional representation to the second mask.

S904: The electronic device performs, in response to a fifth operation, the third operation, to generate a third mask in a third area and project a fourth three-dimensional representation to the third mask.

The fourth three-dimensional representation is a deformed second three-dimensional representation.

Optionally, the fourth three-dimensional representation is a second three-dimensional representation after being zoomed in, zoomed out, or stretched. For example, the fourth three-dimensional representation may be a second three-dimensional representation that is zoomed in by 5 times.

In a possible implementation, the electronic device 100 may further generate the fourth three-dimensional representation based on deformation information and three-dimensional coordinates of the second three-dimensional representation. The deformation information indicates a deformation type and a deformation ratio.

Optionally, an anchor point of the second three-dimensional representation and an anchor point of the fourth three-dimensional representation are the same. The anchor point is a point that is located in a direction of a perpendicular line of a center of gravity of a three-dimensional representation and that has a smallest Z-axis coordinate in a three-dimensional representation.

In a possible implementation, the electronic device 100 may further determine a third field of view based on pose information of the viewfinder picture, and determine a field of view of an area within the third field of view based on a location of the area (for example, the first area, the second area, or the third area) in the viewfinder picture. The third field of view is a field of view corresponding to the viewfinder picture on the three-dimensional map.

Optionally, the pose information may be a 6-DoF pose.

Figure 10:
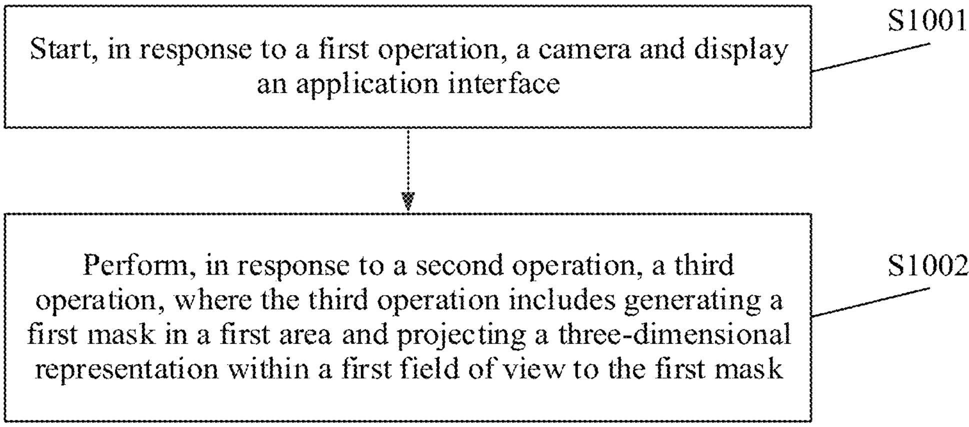
FIG. 10 is a schematic flowchart of another display method according to an embodiment of this disclosure.

An embodiment of this disclosure further provides another display method. The display method may make invisible and disappeared an object that exists in a real scene but does not exist on a three-dimensional map in a viewfinder picture of an electronic device. As shown in FIG. 10, the method includes the following steps.

S1001: The electronic device 100 starts, in response to a first operation, a camera and displays an application interface.

The application interface includes a viewfinder frame, and a viewfinder picture of the viewfinder frame includes a target object.

It may be understood that the viewfinder picture of the viewfinder frame may include a plurality of objects, and the target object is any one of the plurality of objects.

S1002: The electronic device 100 performs, in response to a second operation, a third operation, where the third operation includes generating a first mask in a first area and projecting a three-dimensional representation within a first field of view to the first mask.

The first area is an area in which the target object in the viewfinder picture is located. The first field of view is a field of view corresponding to the first area on the three-dimensional map. The three-dimensional representation includes at least one of a point cloud, a mesh, or semantics.

In a possible implementation, the electronic device 100 may perform the third operation when there is no first three-dimensional representation within the first field of view. The first three-dimensional representation is the three-dimensional representation of the target object.

For example, the three-dimensional map stores a three-dimensional representation of a building. The user wants to view the building through the viewfinder frame of the application interface, but there is a "pedestrian" next to the building. A user wants to make the "pedestrian" in the viewfinder frame disappear from the viewfinder frame. In this case, the user may operate an application to select the "pedestrian" as the target object. In this way, the electronic device performs the third operation, projects a three-dimensional representation corresponding to an area in which the "pedestrian" is located on the three-dimensional map to an area in which the "pedestrian" is located in the viewfinder picture. It may be understood that, because there is no three-dimensional representation of the pedestrian stored on the three-dimensional map, that is, a scene stored on the three-dimensional map is a scene in which the "pedestrian" does not exist. Therefore, the three-dimensional representation of the area in which the "pedestrian" is located on the three-dimensional map may be directly projected to the viewfinder picture, so that the "pedestrian" disappears invisibly in the viewfinder picture.

In a possible implementation, the method may further include that the electronic device 100 determines, based on a first image block, whether there is the first three-dimensional representation in the three-dimensional representation within the first field of view. The first image block is an image block that is in the viewfinder picture and that includes the target object.

It may be understood that, when the first image block matches a corresponding three-dimensional representation within the first field of view, it indicates that there is the three-dimensional representation of the target object within the first field of view, and when the first image block does not match a corresponding three-dimensional representation within the first field of view, it indicates that there is no three-dimensional representation of the target object within the first field of view.

Figure 11:
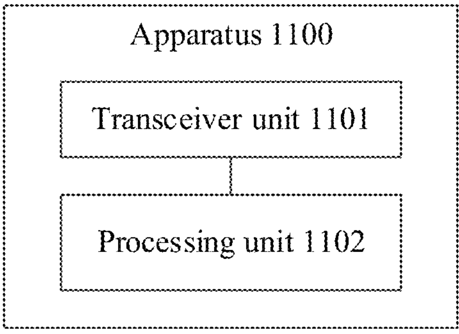
FIG. 11 is a schematic diagram of a structure of an apparatus according to an embodiment of this disclosure.
Figure 12:
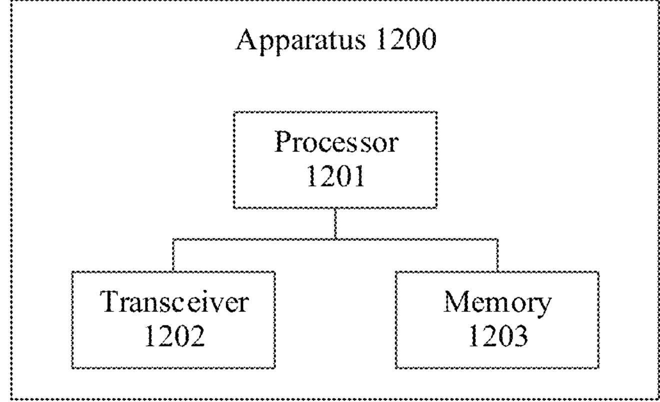
FIG. 12 is a schematic diagram of a structure of another apparatus according to an embodiment of this disclosure.

The following describes an electronic device configured to perform the foregoing display method with reference to FIG. 11 and FIG. 12.

It may be understood that, to implement the foregoing functions, the electronic device includes corresponding hardware and/or software modules for executing the functions. In combination with example algorithm steps described in embodiments disclosed in this specification, this disclosure may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application with reference to embodiments, but it should not be considered that the implementation goes beyond the scope of this disclosure.

In embodiments of this disclosure, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in this embodiment, division into the modules is an example, is merely logical function division, and may be other division during actual implementation.

When each functional module is obtained through division corresponding to each function, FIG. 11 is a possible schematic composition diagram of the electronic device in the foregoing embodiment. As shown in FIG. 11, an apparatus 1100 may include a transceiver unit 1101 and a processing unit 1102. The processing unit 1102 may implement the method performed by the electronic device in the foregoing method embodiments, and/or another process of the technology described in this specification.

It should be noted that all related content of the steps in the foregoing method embodiments may be cited in function description of corresponding functional modules. Details are not described herein again.

When an integrated unit is used, the apparatus 1100 may include a processing unit, a storage unit, and a communication unit. The processing unit may be configured to control and manage an action of the apparatus 1100, for example, may be configured to support the apparatus 1100 in performing the steps performed by the foregoing units. The storage unit may be configured to support the apparatus 1100 in storing program code, data, and/or the like. The communication unit may be configured to support communication between the apparatus 1100 and another device.

The processing unit may be a processor or a controller. The processor may implement or perform various example logical blocks, modules, and circuits described with reference to content disclosed in this disclosure. The processing unit may be a combination implementing a computing function, for example, a combination including one or more microprocessors, or a combination of a digital signal processor (DSP) and a microprocessor. The storage unit may be a memory. The communication unit may be specifically a device, for example, a radio frequency circuit, a Bluetooth chip, and a Wi-Fi chip, that communicates with another electronic device.

In a possible implementation, the electronic device in this embodiment of this disclosure may be an apparatus 1200 with a structure shown in FIG. 12. The apparatus 1200 includes a processor 1201 and a transceiver 1202. Related functions implemented by the transceiver unit 1101 and the processing unit 1102 in FIG. 11 may be implemented by the processor 1201.

Optionally, the apparatus 1200 may further include a memory 1203, and the processor 1201 and the memory 1203 communicate with each other through an internal connection path. A related function implemented by the storage unit in FIG. 11 may be implemented by the memory 1203.

An embodiment of this disclosure further provides a computer storage medium. The computer storage medium stores computer instructions. When the computer instructions are run on an electronic device, the electronic device is enabled to perform the related method steps, to implement the display method in the foregoing embodiments.

An embodiment of this disclosure further provides a computer program product. When the computer program product is run on a computer, the computer is enabled to perform the foregoing related steps, to implement the display method in the foregoing embodiments.

An embodiment of this disclosure further provides an electronic device. The device may be specifically a chip, an integrated circuit, a component, or a module. Specifically, the device may include a connected processor and a memory configured to store instructions, or the device includes at least one processor configured to obtain instructions from an external memory. When the device runs, the processor may execute the instructions, so that the chip performs the display method in the foregoing method embodiments.

Figure 13:
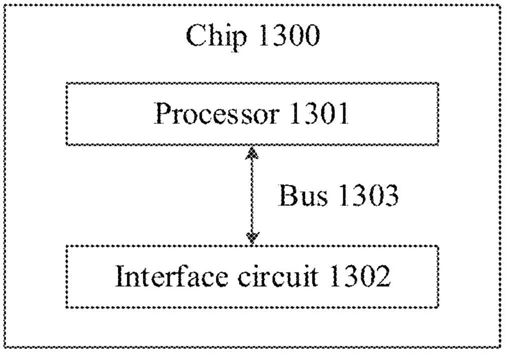
FIG. 13 is a schematic diagram of a structure of a chip according to an embodiment of this disclosure.

FIG. 13 is a schematic diagram of a structure of a chip 1300. The chip 1300 includes one or more processors 1301 and an interface circuit 1302. Optionally, the chip 1300 may further include a bus 1303.

The processor 1301 may be an integrated circuit chip and has a signal processing capability. During implementation, the steps of the foregoing display method may be implemented by using a hardware integrated logic circuit in the processor 1301 or instructions in a form of software.

Optionally, the processor 1301 may be a general-purpose processor, a digital signal processing (DSP) processor, an application-specific integrated circuit (ASIC), a field-programmable gate array (FPGA) or another programmable logic device, a discrete gate or transistor logic device, or a discrete hardware component. The methods and the steps that are disclosed in embodiments of this disclosure may be implemented or performed. The general-purpose processor may be a microprocessor, or the processor may be any suitable processor.

The interface circuit 1302 may send or receive data, instructions, or information. The processor 1301 may process the data, the instructions, or other information received through the interface circuit 1302, and send, through the interface circuit 1302, information obtained after processing.

Optionally, the chip further includes a memory. The memory may include a read-only memory (ROM) and a random-access memory (RAM), and provide an operation instruction and data for the processor. A part of the memory may further include a non-volatile random-access memory (NVRAM).

Optionally, the memory stores an executable software module or a data structure, and the processor may perform a corresponding operation by invoking operation instructions (the operation instructions may be stored in an operating system) stored in the memory.

Optionally, the chip may be used in the electronic device in this embodiment of this disclosure. Optionally, the interface circuit 1302 may be configured to output an execution result of the processor 1301. For the display method provided in one or more embodiments of this disclosure, refer to the foregoing embodiments. Details are not described herein again.

It should be noted that functions corresponding to each of the processor 1301 and the interface circuit 1302 may be implemented by using a hardware design, may be implemented by using a software design, or may be implemented by combining software and hardware. This is not limited herein.

The electronic device, the computer storage medium, the computer program product, or the chip provided in embodiments is configured to perform a corresponding method provided above. Therefore, for beneficial effect that can be achieved by the electronic device, the computer storage medium, the computer program product, or the chip, refer to beneficial effect of the corresponding method provided above. Details are not described herein again.

It should be understood that, in embodiments of this disclosure, sequence numbers of the foregoing processes do not mean execution sequences. The execution sequences of the processes should be determined based on functions and internal logic of the processes, and should not be construed as any limitation on implementation processes of embodiments of this disclosure.

Persons of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The foregoing units described as separate parts may or may not be physically separate, and parts displayed as units may or may not be physical units, may be located in one position, or may be distributed on a plurality of network units. Some or all the units may be selected based on actual requirements to achieve the objectives of the solutions of embodiments.

In addition, functional units in embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, such as a USB flash drive, a removable hard disk, ROM, a RAM, a magnetic disk, or an optical disc.

The foregoing descriptions are merely specific implementations of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A method, comprising:

starting, in response to a first operation, a camera;

displaying, in response to the first operation, an application interface comprising a viewfinder frame, and wherein a viewfinder picture of the viewfinder frame comprises a target object; and performing, in response to a second operation, a third operation, wherein the third operation comprises:

generating a first mask in a first area comprising the target object, wherein generating the first mask blocks display of the target object in the viewfinder picture; and projecting a first three-dimensional representation onto the first mask, such that the target object disappears and a background behind the target object is displayed in the viewfinder picture, wherein a first field of view on a three-dimensional map corresponds to a region on the three-dimensional map that corresponds to the first area, wherein the first field of view on the three-dimensional map comprises the first three-dimensional representation and a second three-dimensional representation of the target object, wherein the first three-dimensional representation is a three-dimensional representation other than the second three-dimensional representation within the first field of view, and wherein each of the first three-dimensional representation and the second three-dimensional representation comprises at least one of a point cloud, a mesh, or semantics.

2. The method of claim 1, wherein the third operation further comprises filling, based on a third three-dimensional representation, an area that is of the first mask and to which the first three-dimensional representation is not projected, wherein the third three-dimensional representation is within a second field of view, and wherein the second field of view is adjacent to the first field of view.

3. The method of claim 1, further comprising performing, in response to a fourth operation, the third operation to generate a second mask in a second area and project the second three-dimensional representation to the second mask.

4. The method of claim 1, further comprising performing, in response to a fifth operation, the third operation to generate a third mask in a third area and project a fourth three-dimensional representation to the third mask, wherein the fourth three-dimensional representation is a deformed version of the second three-dimensional representation.

5. The method of claim 4, further comprising generating, based on deformation information and three-dimensional coordinates of the second three-dimensional representation, the fourth three-dimensional representation, wherein the deformation information indicates a deformation type and a deformation ratio.

6. The method of claim 4, further comprising zooming in, zooming out, or stretching the second three-dimensional representation to obtain the fourth three-dimensional representation.

7. The method of claim 4, wherein a first anchor point of the second three-dimensional representation and a second anchor point of the fourth three-dimensional representation are the same, and wherein the first anchor point is a point that is located in a direction of a perpendicular line of a center of gravity of a three-dimensional representation and that has a smallest Z-axis coordinate.

8. The method of claim 1, further comprising:

determining a third field of view based on pose information of the viewfinder picture, wherein the third field of view corresponds to the viewfinder picture on the three-dimensional map; and determining a field of view of an area within the third field of view based on a location of the area in the viewfinder picture.

9. The method of claim 8, wherein a pose indicated by the pose information has six degrees of freedom (DoF).

10. The method of claim 1, further comprising determining, from three-dimensional representations within the first field of view and based on a first image block, the second three-dimensional representation, wherein the first image block is in the viewfinder picture and comprises the target object.

11. The method of claim 1, wherein the viewfinder picture comprises a plurality of objects, and wherein the target object is any one of the plurality of objects.

12. The method of claim 1, wherein the viewfinder picture comprises an editable object and a non-editable object, wherein the target object is the editable object, wherein a third three-dimensional representation corresponding to the editable object on the three-dimensional map is an editable three-dimensional representation, and wherein a fourth three-dimensional representation corresponding to the non-editable object on the three-dimensional map is a non-editable three-dimensional representation or there is no three-dimensional representation corresponding to the non-editable object on the three-dimensional map.

13. The method of claim 12, further comprising labeling, on the three-dimensional map, the editable three-dimensional representation and the non-editable three-dimensional representation.

14. An electronic device, comprising:

a memory configured to store instructions;

one or more processors coupled to the memory and configured to execute the instructions to cause the electronic device to:

start, in response to a first operation, a camera;

display, in response to the first operation, an application interface, wherein the application interface comprises a viewfinder frame, and wherein a viewfinder picture of the viewfinder frame comprises a target object; and perform, in response to a second operation, a third operation, wherein the third operation comprises:

generating a first mask in a first area comprising the target object, wherein generating the first mask blocks display of the target object in the viewfinder picture; and projecting a first three-dimensional representation onto the first mask, such that the target object disappears and a background behind the target object is displayed in the viewfinder picture, wherein a first field of view on a three-dimensional map corresponds to a region on the three-dimensional map that corresponds to the first area, wherein the first field of view on the three-dimensional map comprises the first three-dimensional representation and a second three-dimensional representation of the target object, wherein the first three-dimensional representation is a three-dimensional representation other than the second three-dimensional representation within the first field of view, and wherein each of the first three-dimensional representation and the second three-dimensional representation comprises at least one of a point cloud, a mesh, or semantics.

15. The electronic device of claim 14, wherein the third operation further comprises filling, based on a third three-dimensional representation, an area that is of the first mask and to which the first three-dimensional representation is not projected, wherein the third three-dimensional representation is within a second field of view, and wherein the second field of view is adjacent to the first field of view.

16. The electronic device of claim 14, wherein the one or more processors are further configured to execute the instructions to cause the electronic device to:

perform, in response to a fourth operation, the third operation to generate a second mask in a second area; and project the second three-dimensional representation to the second mask.

17. A computer program product comprising instructions stored on a non-transitory computer-readable medium that, when executed by one or more processors, cause an apparatus to:

start, in response to a first operation, a camera;

display, in response to the first operation, an application interface, wherein the application interface comprises a viewfinder frame, and wherein a viewfinder picture of the viewfinder frame comprises a target object; and perform, in response to a second operation, a third operation, wherein the third operation comprises:

generating a first mask in a first area comprising the target object, wherein generating the first mask blocks display of the target object in the viewfinder picture; and projecting a first three-dimensional representation within a first field of view onto the first mask, such that the target object disappears and a background behind the target object is displayed in the viewfinder picture, wherein a first field of view on a three-dimensional map corresponds to a region on the three-dimensional map that corresponds to the first area, wherein the first field of view on the three-dimensional map comprises the first three-dimensional representation and a second three-dimensional representation of the target object, wherein the first three-dimensional representation is a three-dimensional representation other than the second three-dimensional representation within the first field of view, and wherein each of the first three-dimensional representation and the second three-dimensional representation comprises at least one of a point cloud, a mesh, or semantics.

18. The computer program product of claim 17, wherein the third operation further comprises filling, based on a third three-dimensional representation, an area that is of the first mask and to which the first three-dimensional representation is not projected, wherein the third three-dimensional representation is within a second field of view, and wherein the second field of view is adjacent to the first field of view.

19. The computer program product of claim 17, wherein the instructions, when executed by the one or more processors, cause the apparatus to:

perform, in response to a fourth operation, the third operation to generate a second mask in a second area; and project the second three-dimensional representation to the second mask.

20. The computer program product of claim 17, wherein the instructions, when executed by the one or more processors, cause the apparatus to determine, from three-dimensional representations within the first field of view based on a first image block, the second three-dimensional representation, wherein the first image block is in the viewfinder picture and comprises the target object.

* * * * *